July 10, 1945. W. J. PASINSKI 2,380,257
CASH REGISTER
Filed Feb. 12, 1940 9 Sheets-Sheet 1

INVENTOR
Walter J. Pasinski
BY Davis, Lindsey, Smith & Shonts
ATTORNEYS

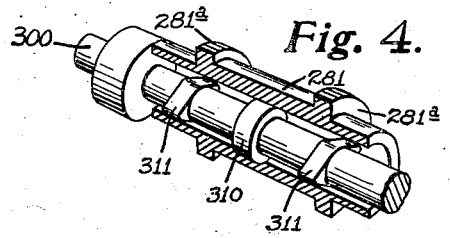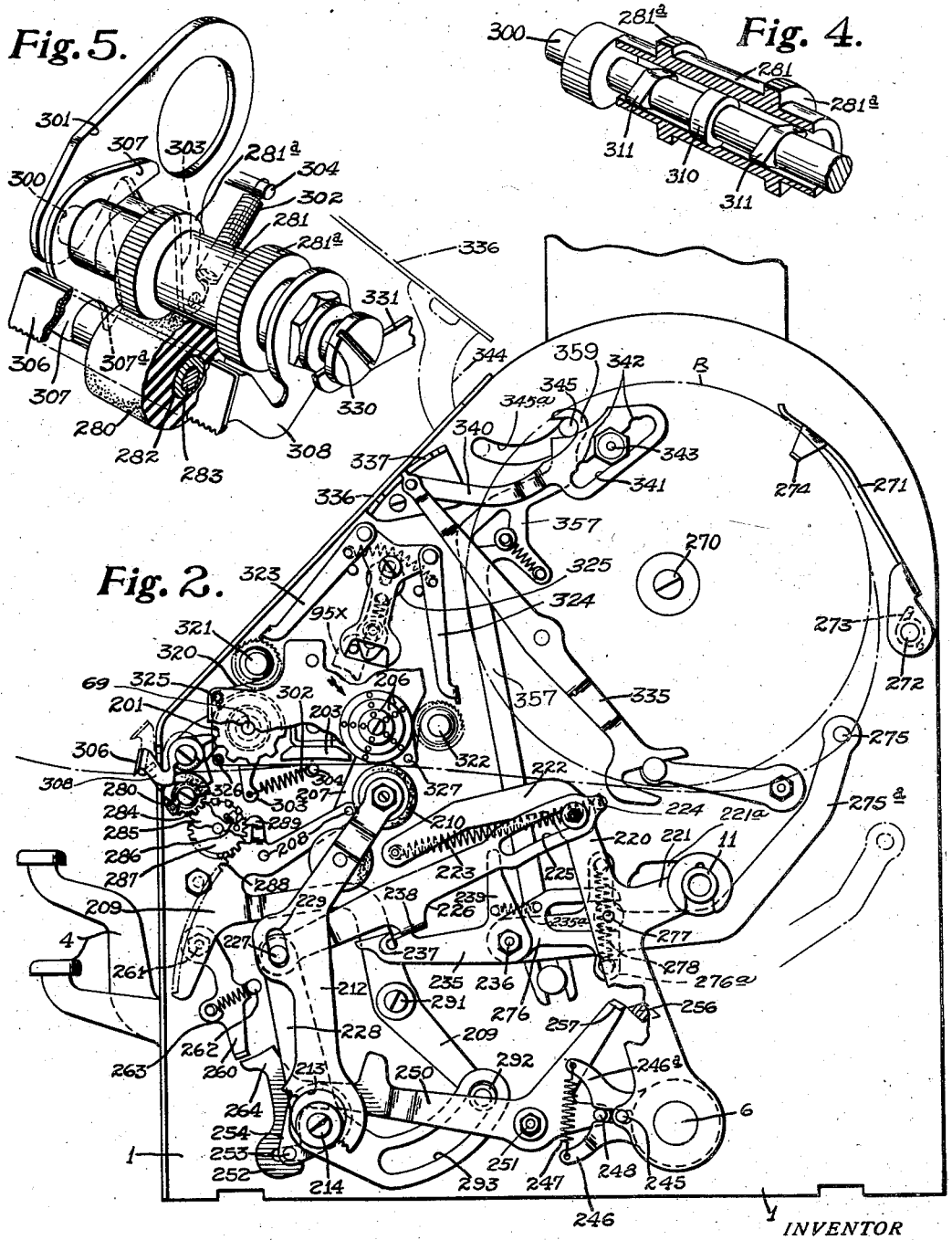

July 10, 1945.  W. J. PASINSKI  2,380,257
CASH REGISTER
Filed Feb. 12, 1940  9 Sheets-Sheet 3

INVENTOR
Walter J. Pasinski
BY Davis, Lindsey, Smith & Shonts
ATTORNEYS

July 10, 1945.  W. J. PASINSKI  2,380,257
CASH REGISTER
Filed Feb. 12, 1940  9 Sheets-Sheet 7

INVENTOR
Walter J. Pasinski
BY Davis, Lindsey, Smith & Shonts
ATTORNEYS

July 10, 1945.  W. J. PASINSKI  2,380,257
CASH REGISTER
Filed Feb. 12, 1940  9 Sheets-Sheet 8

INVENTOR
Walter J. Pasinski
BY
Davis Lindsey Smith & Shonts
ATTORNEYS

July 10, 1945.  W. J. PASINSKI  2,380,257
CASH REGISTER
Filed Feb. 12, 1940  9 Sheets-Sheet 9
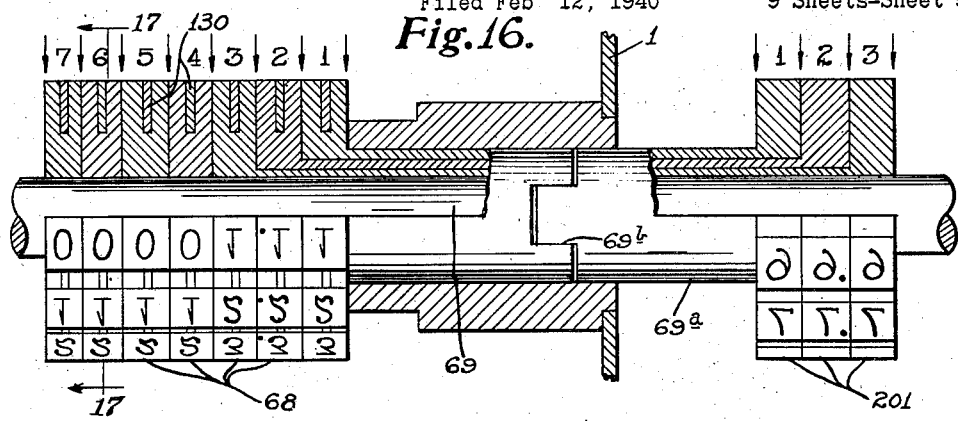
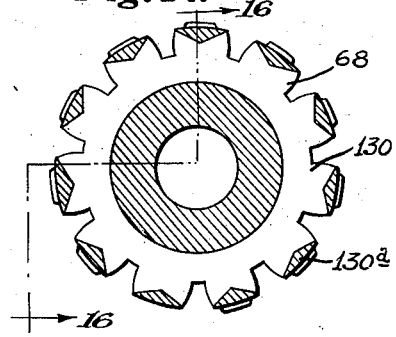
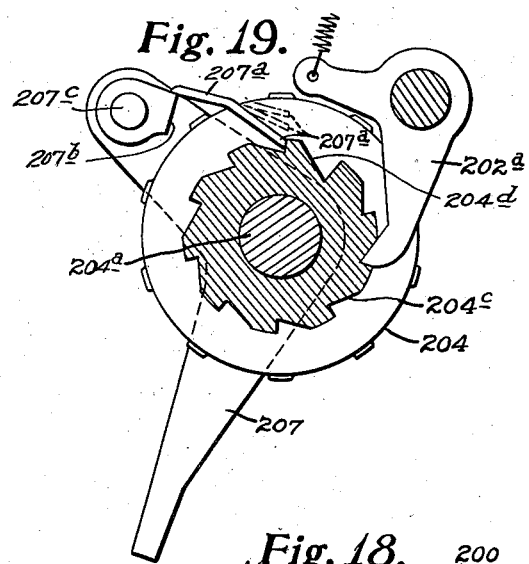
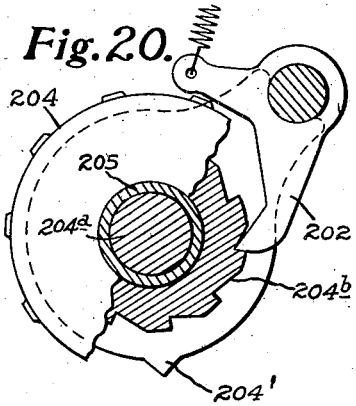
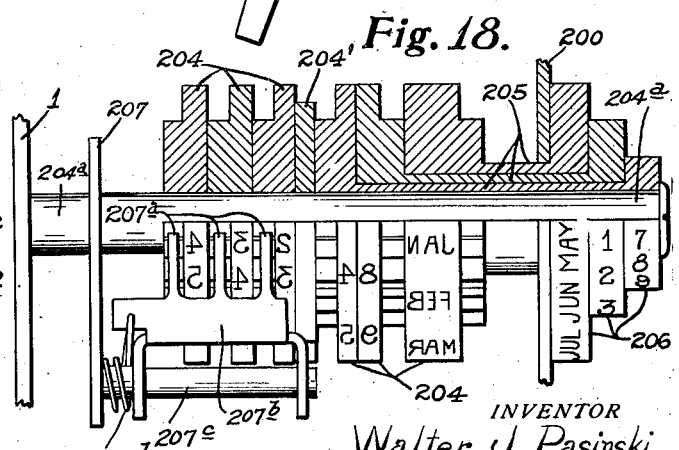
INVENTOR
Walter J. Pasinski
BY Davis, Lindsey, Smith & Shonts
ATTORNEYS Patented July 10, 1945

2,380,257

UNITED STATES PATENT OFFICE 2,380,257

CASH REGISTER

Walter J. Pasinski, Howell, Mich., assignor to Burroughs Adding Machine Company, Detroit, Mich., a corporation of Michigan Application February 12, 1940, Serial No. 318,501

17 Claims. (Cl. 101—93)

This invention relates to cash registers. It is more particularly concerned with a key-operated cash register that not only will print upon and feed a detail-record strip but one which also will print and issue a check or receipt.

Cash registers in which certain mechanisms are actuated by depression of the amount keys have been made for many years and are still on the market, such machines being less expensive than motor-operated ones and being satisfactory for certain classes of work. The big difficulty with key-operated machines has been hard and non-uniform key depression, and this has been true even where the machines perform no printing functions. Because of this, it has not been considered feasible to add to the load on the keys and the great majority of key-operated cash registers in use today are non-printing machines that merely register items in a registering mechanism whose dials are visible.

Key-operated cash registers have been produced that will either print on a detail-record strip that is kept in the machine or on a check strip that is issued. But, even when these printing mechanisms were used individually, they increased the load on the keys undesirably. As a consequence, such machines are generally motor operated.

Present-day receipt checks issued by cash registers must bear numerous impressions in addition to the amount of an item, such, for example, as the name of the vendor, which may require several lines, the number and date of the check, and some legend such as "Please pay cashier." Obviously, the printing of all this data requires a forcible printing impression means and the problem is not solved by a construction that will print only a few digits such as the amount of an item. Prior to the present invention, no practical and commercially acceptable key-operated cash register has been produced that will print on a detail-record strip and feed the strip and also print and issue a modern type of check receipt. This is because it has been considered impossible to accomplish both results in the same key-operated machine without making the key depression so hard as to make the machine impractical and non-salable. The present invention is directed to a solution of this problem and the result has been attained by the proper combination and arrangement of elements hereinafter described.

The general object of the invention is to provide an improved key-operated cash register.

A more particular object is to provide a key-operated cash register that not only will print on a detail-record strip but one which also will print on a check strip from a plurality of sets of type-carrying elements and issue the check.

Another object is to provide certain improvements in check printing and issuing mechanisms.

Other objects and advantages of the invention will appear from the following specification.

An embodiment of the invention is shown in the accompanying drawings, in which:

Fig. 2 is a right end elevation of the receipt printing mechanism with the parts in normal or home position;

Fig. 4 is a cut-away perspective of the upper feeding roll and supporting shaft;

Fig. 5 is a fragmentary perspective of the receipt feeding rolls;

Fig. 16 is a plan view of the record printing and receipt printing wheels illustrating the connections therebetween;

Fig. 17 is a sectional view taken through one of the printing wheels;

Fig. 18 is a plan view of the consecutive numbering wheels and the date printing wheels, portions being broken away to show the telescopic arrangement of the date section;

Fig. 19 is a section through the consecutive numbering mechanism;

Fig. 20 is a partial end elevation, broken away in part, of the date printing mechanism.

This application is a continuation-in-part of my copending application Serial No. 264,328, filed March 27, 1939.

GENERAL CONSTRUCTION

The general features of the machine, such as the amount keys, the registering mechanism, the indicating mechanism, and the general operating means, are like those shown in my prior Patents Nos. 2,070,059 and 2,070,060 where these parts are described in detail. Only a brief description will be given here.

Figure 3:
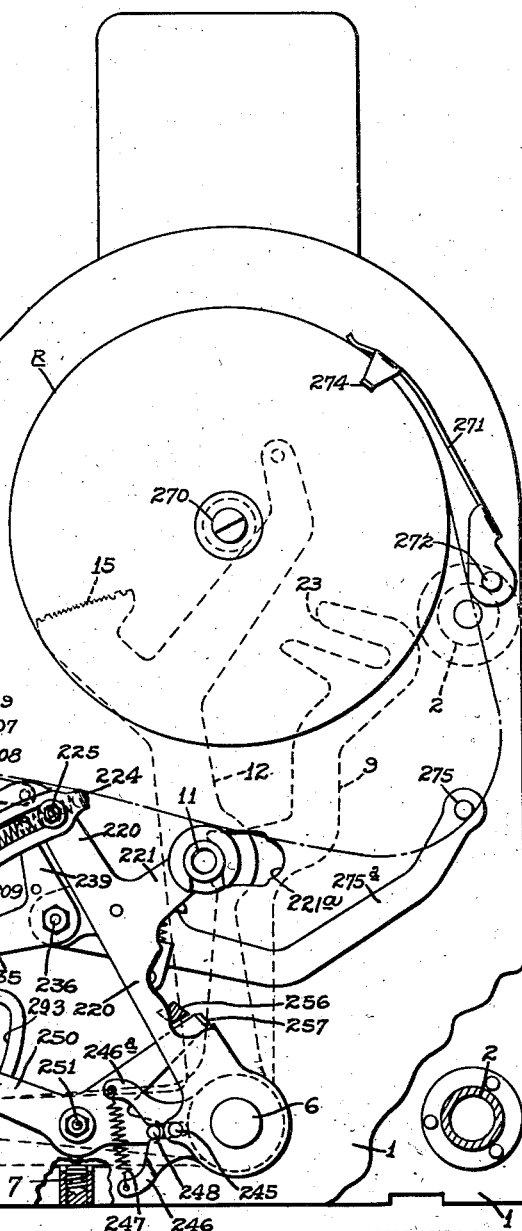
Fig. 3 is a right side elevation of the receipt issuing mechanism illustrating the parts in their respective positions with a key depressed.

The cash register mechanism is carried between right and left side plates 1 (Figs. 2 and 3) which support the entire mechanism and are maintained in spaced relation by tubular members 2 and cross shafts of the cash register mechanism. The cash register operating mechanisms include two rows of depressible keys 4 of the necessary denominations, depending upon the capacity of the machine, the illustrated machine having three denominations, that is, cents, tens of cents and dollars. The keys are in fact key levers journaled on a common cross shaft 6 journaled in the end of plates 1 and are urged clockwise about the shaft by springs 7 (Fig. 3). Each key has a rearwardly and upwardly extending arm 9 which engages a hollow universal cross shaft 11 supported at each end by one arm of a full-stroke lever 12 secured to the shaft 6 adjacent each end thereof. The shaft 11 and full-stroke levers 12 constitute a universal bail which is constantly urged clockwise by springs 14 secured to horizontal portions of levers 12 (Fig. 8), the latter terminating at their upper ends in full-stroke sectors 15 engageable by pawls (not shown) to insure a full stroke being made at each key depression.

A key coupler 18 is pivotally supported by shaft 11 and is spring urged clockwise so as to engage the keys when the coupler is released. The coupler extends across substantially the entire width of the machine and is in position to be engaged by projections 19 of the keys of all denominations, whereby any key may be partially depressed and latched to the key coupler. The universal bail and key coupler construction is more fully disclosed in my prior Patent No. 2,070,060, issued February 9, 1937, to which reference is made for further details.

The upper end of each key lever terminates in a differential cam slot 23 (Figs. 8 and 9), the different slots being of different inclinations according to the value of the key. The keys of each denomination engage a bail 30 (Fig. 9), which extends across and is positioned to be engaged by the edges of the slots 23 of the corresponding denomination of key levers. Each bail 30 is carried by spaced arms 31 journaled on shafts 32 and is also connected to an indexing yoke 33 by forked arm 34 (Fig. 9). Each yoke 33 is differentially positioned by its bail 30 in accordance with the key depressed in its denomination and indexes a tab magazine 35 supported thereby which carries tabs 36 bearing indicia of 1 to 9 which are raised and lowered at the proper point in the machine operation. The tab indexing and raising is accomplished as described in my prior Patent No. 2,070,061, issued February 9, 1937, to which reference is made for further description.

Figure 11:
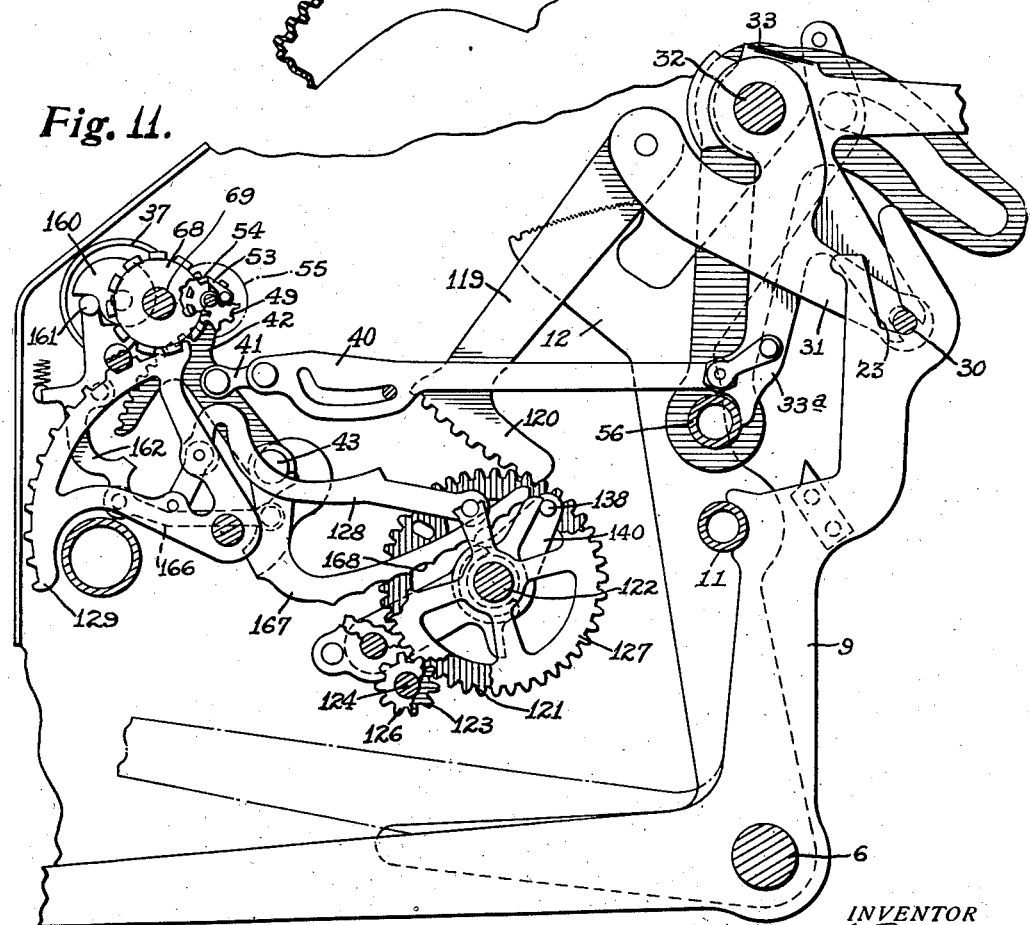
Fig. 11 is a further detailed partial end elevation of the indexing mechanism with one key depressed and associated parts in corresponding positions.

A registering mechanism is provided comprising a plurality of register pinions 37, there being a group of register pinions for each group of denomination keys. A suitable tens-transfer mechanism is provided as described in said prior patents. The register pinions 37 are indexed by the amount keys through the denominational bails 30 and the yokes 33 (Fig. 11). Each yoke 33 has a downwardly extending arm 33ª (Fig. 11) connected through links 40 and 41 to an actuator 42 pivoted at 43 and urged clockwise by a spring, not shown. Each actuator is in mesh with an operating gear 49 (Fig. 11) for its register pinion, said gear carrying a spring pressed pawl 53 positioned to engage studs 54 carried by a gear 55 that is connected to its register pinion 37.

When an amount key is depressed, the bail 30 in the denomination of said key is moved forward (Fig. 11) an amount corresponding to the digital value of the key depressed. This rocks the bail 33 clockwise and thrusts the links 40 and 41 forward to rock the actuator 42 counterclockwise. This rotates the gear 49 clockwise, at which time the pawl 53 passes over the studs 54 without causing any rotation of gear 55. When the amount keys are released, they are restored to normal by springs, at which time a restoring bail 56 (Fig. 11) returns the yoke 33 and the links 40 and 41 to normal, thereby moving the actuator 42 clockwise. This movement of the actuator rotates the gear 49 counterclockwise and the pawl 53, acting on one of the studs 54, rotates the gear 55 and the corresponding register pinion an amount corresponding to the value of the key depressed. For further details, reference is made to my prior Patent No. 2,070,062, February 9, 1937, and Horton No. 1,326,504, December 30, 1919.

All the above-described mechanisms, including the registering mechanism, the indicator mechanism, and the universal bail and key coupler with associated parts comprising the general operating means, are operated by power derived from depression of the amount keys, and they are of such a nature and are so arranged that the load on the keys is exceptionally light and substantially uniform throughout their full movement, as described in the prior patents referred to.

DETAIL-RECORD STRIP PRINTER

Provision is made for printing items as well as totals on a detail-record strip which remains in the machine. Item printing is performed by power derived from depression of the amount keys, but totals are printed by means of a total lever. The record strip normally occupies a position where the last printed item is visible through an opening in the face plate of the machine (Fig. 1) and, during each machine operation, the paper is moved from this position to a printing position, after which it is returned to where the currently printed item is visible, a line-spacing operation occurring automatically. The detail-record strip printer is described in detail in my copending application Serial No. 306,340, filed November 27, 1939, now Patent 2,249,224, and it will be described only briefly here.

Figure 8:
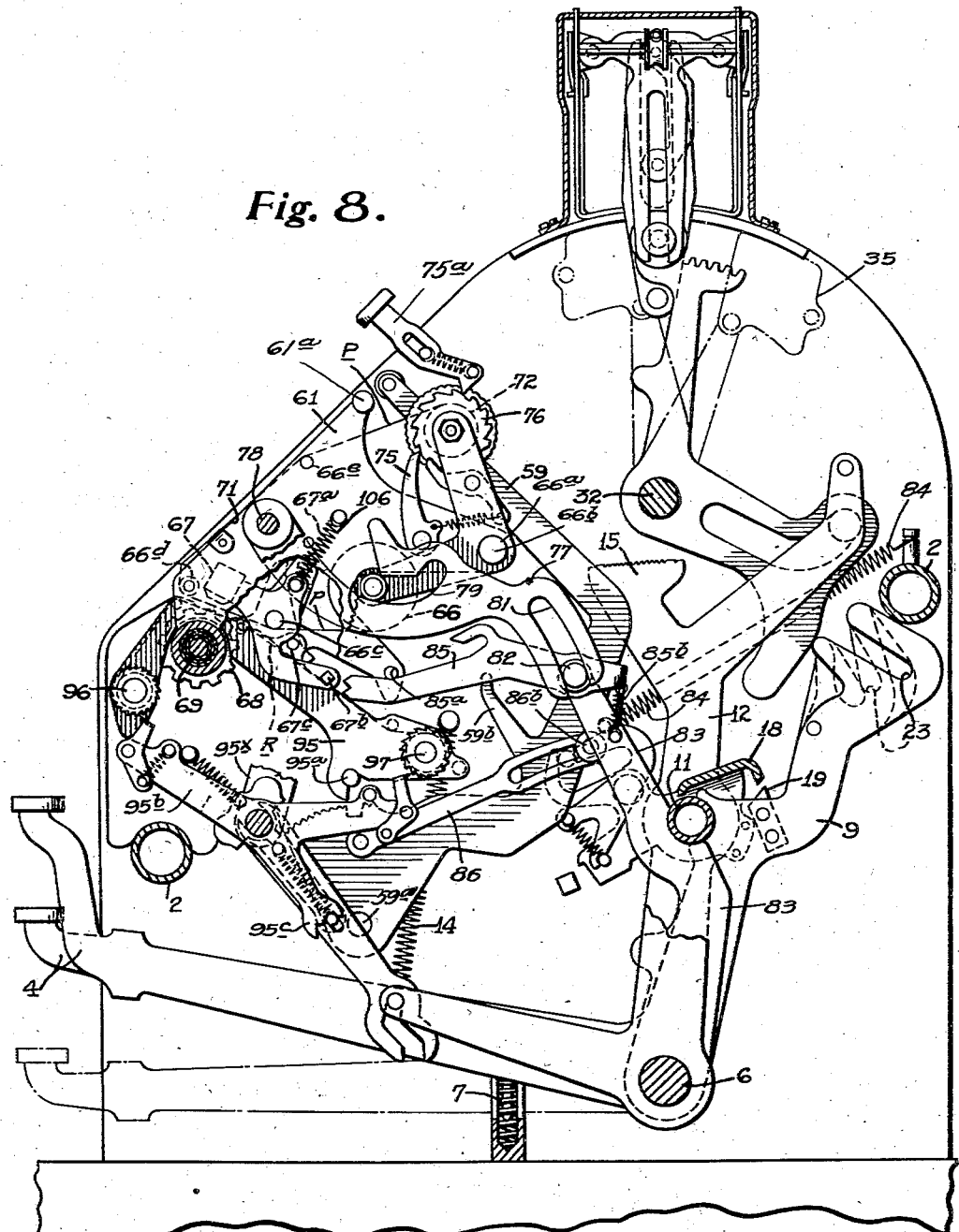
Fig. 8 is a right end elevation of the machine taken inside of the right end plate.
Figure 9:
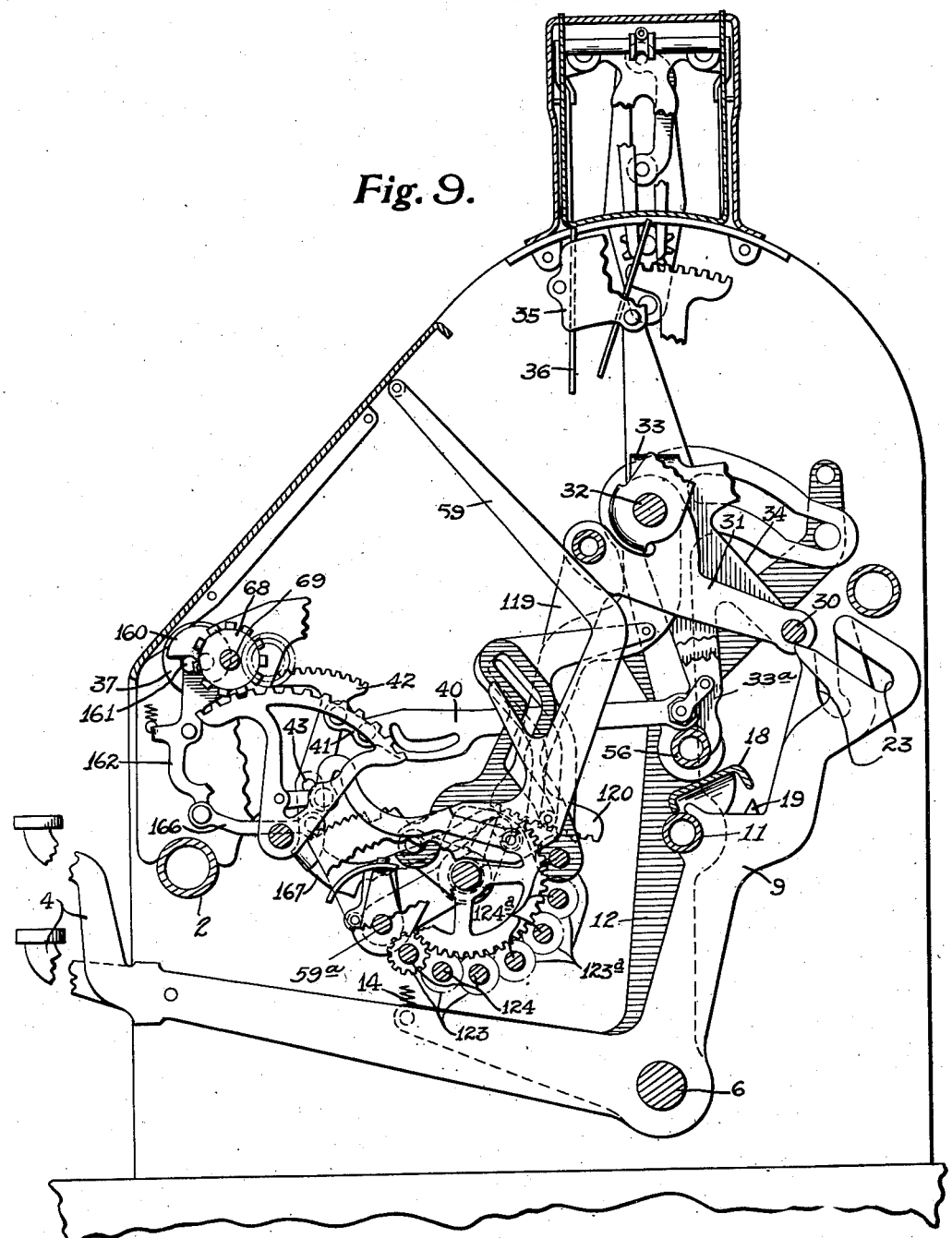
Fig. 9 is a sectional view taken farther inside the machine and illustrating primarily the indexing mechanism of the machine.

Referring to Fig. 8, a plurality of type-carrying elements are provided in the form of type wheels 68 (Figs. 10 and 16) rotatably mounted on a shaft 69 carried by the right-hand side plate 1 of the machine, the type wheels being on the inside of said side plate. These type wheels are indexed by the amount keys as presently will be described.

The detail-record strip P is in the form of a continuous paper strip fed from a supply roll 66 rotatably mounted in the lower arms of a pair of bell crank levers 66$^a$ pivoted on the shaft 66$^b$ carried by two small detachable side plates 61. These side plates, together with the parts carried by them, which presently will be described, constitute a detachable unit that may be readily removed from the machine. The side plates 61 rest on the shaft 69 (Fig. 8) and the unit may be rocked forward about this shaft by pulling on the hand piece 61$^a$ after which said unit can be easily lifted out. The detail strip P passes from the supply roll 66 under a stationary guide shaft 66$^c$, across the printing line of the type wheels 68, about a stationary guide shaft 66$^d$, over a stationary paper table 71 and over a stationary guide 66$^e$ to where it is wound on a storage reel 72 rotatably mounted in the upper arms of the bell cranks 66$^a$, said guides and paper table being carried by the detachable side plates 61 and being located around the periphery of the detachable unit. The bell cranks carrying the storage and supply spools are urged clockwise to the position of Fig. 8 by a spring, not shown, but each time the machine is operated, said bell cranks are rocked counterclockwise, whereupon the record strip is slid over the stationary guides and paper table to a printing position relative to the printing line of the type wheels, after which said strip is returned to normal. In the normal position of the record strip, the last printed entry is visible right-side-up through a window 70 (Fig. 1) in the face plate of the machine and it is the item immediately above the lower edge of the opening. As the bell cranks 66$^a$ are rocked counterclockwise during depression of the amount keys, a pawl 75 engages one of the teeth of a ratchet wheel 76 connected to the storage reel 72, and rotates said reel sufficiently to line space the record strip so that the next entry will be in proper position with relation to the prior one. If desired, the strip may be manually line spaced by means of a depressible key 75$^a$ (Fig. 8).

The bell cranks 66$^a$ are rocked to move the record strip from visible to printing position and return by means of a lever 77 pivoted on a stud 78 fixed to the inside of the right-hand side plate 1. This arm has a cam slot 79 engaging a roller stud 80 on the end of one of the bell cranks 66$^a$. The rear end of said arm 77 has a cam slot 81 engaging over a bail 82 carried by a pair of arms 83 journaled on the shaft 6, said arms being positioned in front of the universal bail 11 and urged clockwise as viewed in Fig. 8 by springs 84. When the amount keys are depressed and the universal bail 11 is moved forward, the arms 83 with the bail 82 are also moved forward. This rocks the arm 77 clockwise and the cam slot 79, acting on the roller stud 80, rocks the bell cranks 66$^a$ counterclockwise to slide the record strip over the stationary guides and the paper table to printing position and automatically line spaces it. When the amount keys are released, the springs 84 return the bail 82 to normal, whereupon the arm 77 is rocked counterclockwise to restore the bell cranks 66$^a$ with the storage and supply spools to normal, which slides the record strip P to a position where the currently printed item is visible. This arrangement enables the parts to be moved with a very light key depression as explained in more detail in said copending application. Mounted on the shaft 66$^c$ carried by the detachable side plates 61 is a printing impression means in the form of a printing hammer platen 67. This hammer is normally maintained in the position shown in Fig. 8, slightly above the type wheels 68, by means of a spring 67$^a$. The printing hammer is cocked by means of an arm 85 pivoted on the bail 82 and urged clockwise against a stud 85$^a$ on one of the side plates 61 by a spring 85$^b$. The forward end of the arm 85 constitutes an abutment positioned to engage a stud 67$^b$ on an arm of the printing hammer bail. When the amount keys are depressed and the bail 82 moved forward, the abutment end of arm 85 engages the stud 67$^b$ and rocks the printing hammer clockwise, which tensions the spring 67$^a$. Near the end of the key depression, the arm 85 is cammed by the stud 85$^a$ to a position to release the hammer, whereupon it is suddenly moved, or "fired" by the spring 67$^a$ to make a printing impression, said hammer being immediately retracted to its normal position.

Only three type wheels are used for item entering, although there is a total of seven type wheels. All seven wheels are used in total printing and the four wheels other than the "item" type wheels will be called the "extra" type wheels. The four "extra" type wheels normally have blank spaces at the printing line as explained in said copending application. In item printing operations, the printing hammer 67 is cocked only sufficiently to enable it to be fired with a force that will give a clear printing impression from the three type wheels and thus, in normal operations, a minimum force is required for making the printing impressions.

In taking totals, the detail strip printer is operated by means of a total lever 59 (Figs. 8, 9 and 10) pivoted on a shaft 59$^a$. Pivoted to the lower part of the lever 59 is a link 86 (Fig. 8), provided with a slot 86$^a$ in which is positioned a stud 86$^b$ on one of the arms 83. This slot is of such a length that, when the arms 83 are moved forward by depression of the amount keys, the stud 86$^b$ moves in the slot 86$^a$ without affecting the link 86. When the total lever 59 is pulled forward in a counterclockwise direction (Fig. 8), the link 86 moves with it and pulls the arms 83 forward. This moves the bail 82 forward to actuate the arm 77 to move the record strip and said bail also moves the arm 85 forward into engagement with the stud 67$^b$ to cock the printing hammer. In total-taking operations, it is necessary to obtain an imprint from all seven of the type wheels, and in order that a clear impression may be made, the spring 67$^a$ of the hammer 67 is stretched to a greater degree in order that the hammer 67 may be fired with greater force. This is accomplished by means of a projection 59$^b$ on the total lever 59 (Fig. 8) which engages a stud 67$^c$ on a three-armed member 67$^d$ pivoted on the shaft 66$^c$. This engagement occurs prior to the release of the hammer 67 from the arm 85 and it results in rocking the printing hammer 67 farther clockwise than when the amount keys are depressed. Near the end of the forward movement of the total lever 59, the printing hammer is released, whereupon it is fired with greater force to print the total. The long leverage of the total lever makes the parts easy to operate and the arrangement provided enables a clear impression to be obtained without, however, placing any load on the amount keys, which, when operated, need operate the printing mechanism only with sufficient force to make an impression from the three "item" type wheels.

The actual impression on the record strip is made by means of an ink ribbon R (Fig. 8) extending over guides on a frame 95 which also carries two ribbon spools 96 and 97. The frame 95 is readily detachable, being hooked over a shaft 95a carried by the right-hand side plate 1 of the machine and resting on the shaft 69 carrying the type wheels. The ribbon R is fed during machine operations by a pawl and ratchet mechanism designated generally as 95b, which mechanism is provided with a ribbon reverse device designated generally as 95c. These parts are described in more detail in said copending application.

Figure 10:
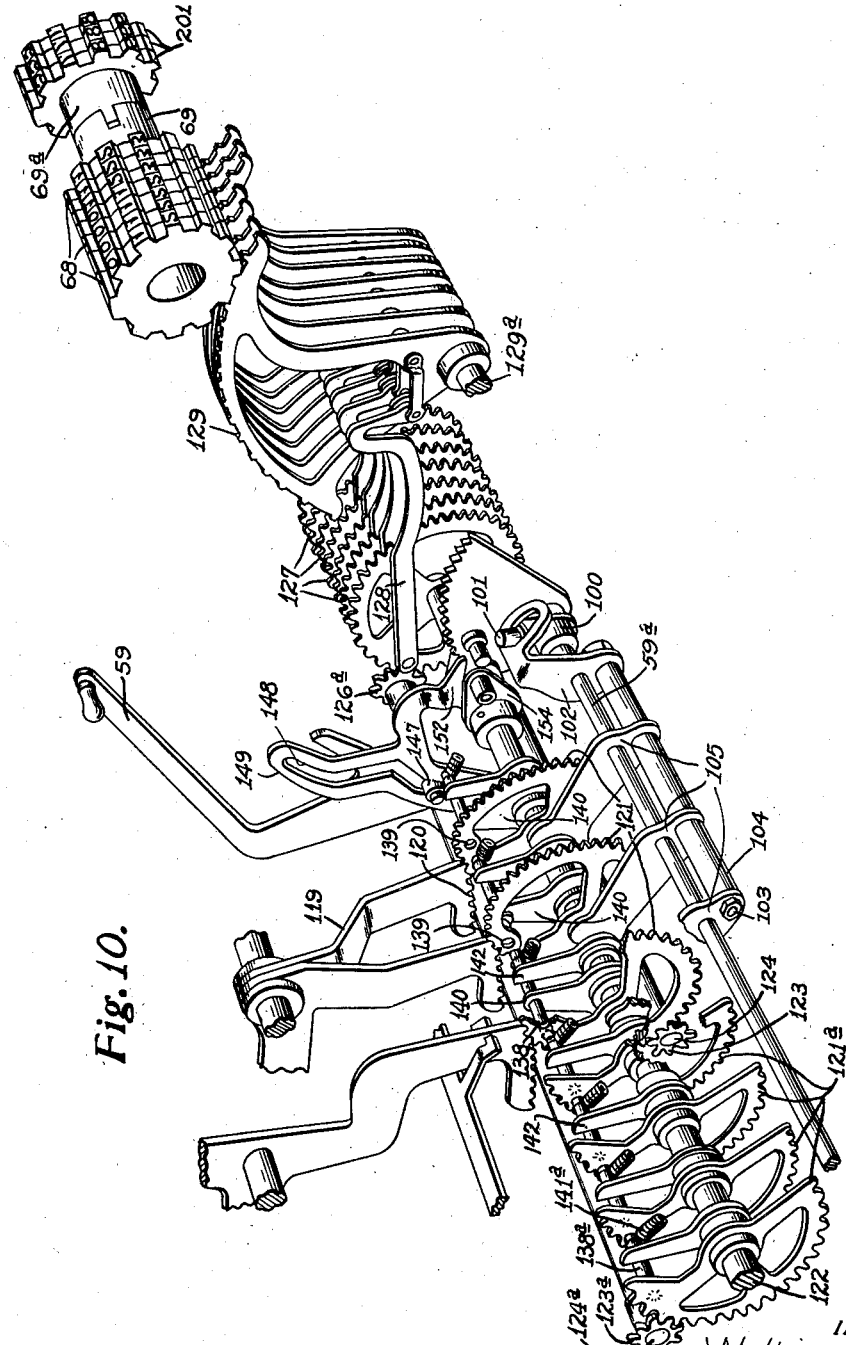
Fig. 10 is a perspective view from the left corner of the machine and illustrates the indexing and printing mechanisms for both record and receipt printing.

The type wheels 68 are indexed for item and total printing by means of mechanism shown more particularly in Figs. 9, 10 and 11. One of each of the pairs of arms 31 that carry the denominational bails 30 is provided with a downwardly extending projection 119 having a toothed sector 120 on its lower face (Fig. 10). Each sector normally meshes with a sector 121 rockably mounted on a shaft 122 carried by the side frames of the machine. Each sector 121 also meshes with a corresponding spur gear 123, said spur gears being fixed to parallel shafts 124 (Fig. 9). The shafts 124 extend to the right in Fig. 10 and as the machine is viewed from the front, and, near their right-hand ends, each shaft has another spur gear 126 fixed to it. The spur gears 126 mesh with respective gears 127 journaled on the shaft 122. Each of the gears 127 is connected by a link 128 to a toothed segment 129 journaled on a shaft 129a. The teeth of the segments 129 mesh with the teeth of the "item" type wheels 68 as shown in Fig. 10. From this it will be understood that, when an amount key is depressed and its denominational bail 30 moved, the corresponding arm 119 will be moved to an extent depending upon the value of the key. This will correspondingly move the sector 121, the gear 123, the gear 126, the gear 127, the sector 129 and the corresponding "item" type wheel 68. Thus, the "item" type wheels are indexed directly from the amount keys.

In total printing, it is necessary to disconnect the "item" type wheels from the amount keys and to index all the type wheels under the control of the registering mechanism. This is accomplished automatically by the movement of the total lever 59. Referring to Fig. 10, the hub 100 of the total-taking lever 59, which is pivoted on shaft 59a, carries a stud 101 operating in a cam slot in a member 102 slidably mounted on shaft 59a. The member 102 is connected by a suitable shaft 103 and sleeves 104 to three arms 105 whose rear ends are forked and connected to the hubs of the sectors 121 so as to be able to slide said sectors laterally. As the total lever 59 is pulled forward, the stud 107 acting in the cam slot in member 102 moves the arms 105 laterally to slide the three sectors 121 laterally to disconnect them from the toothed sectors 120. Thus, as the total lever is moved forward, the "item" type wheels are disconnected from the amount keys.

In order that the four "extra" type wheels used in total taking may be indexed, four sectors 121a are journaled on the shaft 122. These sectors mesh with respective gears 123a fixed to shafts 124a (Fig. 9) that extend to the right where each shaft carries on its right-hand end a gear 126a meshing with a corresponding gear 127. The gears 127 are connected by links 128 with toothed sectors 129 that mesh with the respective four "extra" type wheels used in total printing.

Journaled on the shaft 122 are three arms 140 (Figs. 10 and 11) carrying studs 138, said arms being urged clockwise in Fig. 10 by springs 141. The sectors 121a carry similar studs 138a (Fig. 10) to which springs 141a are attached for urging the sectors 121a clockwise in Fig. 10. The arms 140 and sectors 121a are normally prevented from moving by a series of restoring arms 142 fixed to the shaft 122. The studs 138 are normally disengaged from the sectors 121 that control the "item" pinions. Said sectors 121 have openings 139 for the reception of the studs 138, said openings being positioned one step away from the studs. The total lever 59 carries a stud 147 (Fig. 10) operating in a cam slot 148 in a pivoted member 149 which has a forked extension 152 engaging a stud on a crank 154 fixed to the shaft 122. The arrangement is such that, when the total lever 59 is pulled forward, the shaft 122 is rocked clockwise (Fig. 10) and the arms 140 are rocked in the same direction to release the arms 140 for the "item" sectors 121, and to release the sectors 121a for the "extra" type wheels, whereupon the sectors 121a immediately start to move under the urge of the springs 141a. The arms 140 also start to move and the parts are timed so that these arms move one step after which the "item" sectors 121 are moved laterally to move the openings in said sectors over the studs 138 carried by arms 140. This timing is controlled by the shape of the cam slot in the member 149, and is explained in more detail in my said copending application Serial No. 306,340. In this manner, the "extra" type wheels are brought into proper alignment with the "item" type wheels for printing.

In order that all the type wheels may be positioned in accordance with the total in the registering mechanism, the register pinions are provided with snail cams 160 (Fig. 9) engaged by studs 161 on members 162 spring urged clockwise about their pivots as shown in Figs. 9 and 11. Each member 162 is connected by a link 166 to a member 167 (Fig. 11) pivoted at 43. Each member 167 as a series of notches 168 in it corresponding to the digital positions of its register pinion. These notches are positioned in the path of the respective studs 138 and 138a in the respective orders. The result is that, when the arms 140 with the studs 138 for the "item" type wheels, and the studs 138a for the "extra" type wheels, are released by the total-taking lever for movement, said arms and sectors move to positions determined by the notches in members 168 that, in turn, are positioned in accordance with the amount in the register. Consequently, the sectors 121 and 121a will be moved distances corresponding to the amount in the register and the type wheels connected to these sectors will be moved a corresponding amount. In other words, the type wheels are positioned in accordance with the amount in the registering mechanism. After the type wheels are positioned, the printing hammer 67 is released as heretofore explained and the total is printed, after which the total lever is returned to normal and the parts above explained are likewise returned to normal. Further details of the total printing mechanism are described in said application Serial No. 306,340.

It is to be noted that the detail strip printer is mounted between the main side plates 1 of the machine, and within the body of the machine, but that the main portion of the mechanism is located at the right-hand side of the machine and on the inside of the right-hand side plate. There is ample space at the right-hand side of the key-operated non-printing register to add the detail strip printer to a non-printing machine without requiring that the side plates be spaced differently or that there be any essential changes in the general mechanism of the machine. This is important from a production standpoint and is also important in combination with the receipt-check printer as will presently appear, and particularly because of the ready accessibility of the detail strip printer.

As previously explained, the storage and supply rolls, as well as the guides and paper table for the detail strip and the printing impression hammer, are all carried by the detachable side plates 61. These parts constitute a detachable unit which may be quickly removed from a machine by pulling forward on the handle 61a (Fig. 8) and lifting out the section. When the section is lifted out, a new supply roll may be easily put in position, and the new paper strip may be quickly placed in operative position by winding it around the outside of the unit. The guides, the table, and the parts over which the strip slides are near the periphery of the unit so that the placing of the paper in operative position amounts to little more than turning it around the unit and fastening it to the storage roll. If it is desired to replace the ink ribbon or to adjust its mechanism, the ink ribbon unit can be easily removed. Thus, while the detail strip printer is mounted in a recess within the body of the machine, it has been constructed so that it is readily accessible. This is important in combination with the check-receipt printer because if the detail strip printer were mounted on the outside of the side plate, there would then be no place for the receipt printer. Or, if another side plate were added to carry the check-receipt printer, then the detail strip printer would be inaccessible, a condition that is highly undesirable.

RECEIPT-CHECK PRINTER

The receipt-check printer has its various elements so constructed and arranged that they may be connected to the other mechanisms of the machine and yet be mounted on the outside of the right-hand side plate 1. This not only puts them in an accessible position but it also enables the receipt printer to be added to the main body of the machine and combined with it without requiring any changes in the main body. It is simply necessary to add the receipt printer and provide a housing that is slightly wider than that used when the cash register is provided without the receipt printer.

A commercially acceptable receipt-check of the present day must contain data other than the amount of the purchase. Such checks should contain the name of the proprietor or his business concern, the date, the number of the check, the amount of the purchase and some legend such as "Please pay cashier." The data, such as the proprietor's name and "Please pay cashier" does not change and, hence, can be printed best from a plate such as an electroplate or "electro." But this plate must be of considerable size and, quite obviously, considerable force is required to make a printing impression from it; and additional force is required to print from the "item" wheels and from date and consecutive numbering devices. So far as known, no successful key-operated cash register has ever been made that will print both on a detail-record strip and on a check from a plurality of sets of type-carrying elements of the character described, and issue the check. In the present invention, the proper combination and arrangement of parts has been achieved to obtain this result with a very light and uniform key depression. In fact, the addition of the receipt printer to the cash register having a detail strip printer increases the force required for key depression by only about two pounds.

The various type-carrying elements will be explained first, after which the printing mechanism proper and the check strip handling equipment will be described.

a. Item type-carrying elements

The item type-carrying elements are in the form of three "item" type wheels 201 (Figs. 2, 3 and 16) rotatably mounted upon an extension of the shaft 69 that carries the "item" type wheels 68 for the detail-record strip printer. The outer end of the shaft 69 is carried by a very small side plate 200 (Figs. 2 and 3) which is attached to the main side plate 1 by pins or bolts that permit it to be easily attached. This plate carries certain others of the type-carrying elements as will presently appear. The "item" type wheels 68 (Fig. 16) are carried by nested sleeves which extend to the right in order that they may be detachably connected to similar nested sleeves 69a carrying the "item" type wheels 201 for the check-receipt printer. The two sets of sleeves have interlocking shoulders 69b operatively connecting them together. In this manner the check-receipt type wheels 201 can be easily attached to the machine and connected to the record strip type wheels so that both sets of type wheels will be indexed by the amount keys.

It will be observed that the type wheels 201 of the check printing group are arranged differently from those of the detail-strip printing group. This is to get the printing impression in the right position on the detail strip and the check respectively. The printing line for the detail-record strip wheels is at the top while that for the receipt printing wheels is at the bottom of the group.

It will be observed that the two groups of type wheels are indexed by direct connection with the toothed sectors 129 (Fig. 10) as contrasted with the usual construction where the toothed sectors engage steel gears that, in turn, are connected through shafts or other parts to the type wheels. The type wheels are preferably die-cast and made of relatively soft metal which facilitates the die-casting and the formation of characters. The same teeth that bear the characters form the teeth that engage the sectors 129. The two sets of type wheels have an appreciable mass which must be started and stopped rather suddenly in indexing. This offers no problem where the indexing sectors engage separate steel gears, but, where the structure is simplified by eliminating these gears and operating on the type wheels directly, it is liable to cause undesirable wear on the soft metal wheels. To prevent this, the wheels are cast about a steel insert 130 (Fig. 17). This insert is positioned so that it does not interfere with the formation of the characters on the ends of the teeth; yet its edges are positioned so as to form wear surfaces of steel that prevent undesirable wear on the teeth by the indexing sectors while also increasing the strength of the wheels. This construction enables a simplified combination of parts to be used for indexing the wheels and at the same time enables the wheels to be made by an inexpensive die-casting process.

b. Legend-carrying plate

Figure 7:
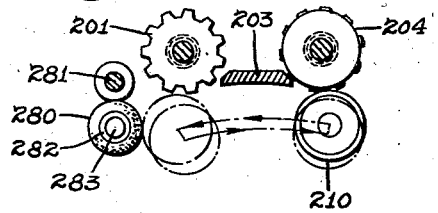
Fig. 7 is a schematic view of the printing elements and the platen roller illustrating the various positions of the latter.

Several legends, such as the name of the proprietor and the words "Please pay cashier," and any other printed matter that may be desired, are printed by means of a printing plate 203 which is supported by the small side plate 200 as shown in Fig. 2. The plate 203 is slightly arc-shaped as illustrated in Fig. 7 for a purpose that will be later described. It is generally made by an electroplating process and is sometimes called an electroplate or an "electro."

c. Date type-carrying elements

Immediately to the rear of the legend printing plate 203 are six type wheels 204 rotatably mounted on a shaft 204a (Figs. 2 and 18) fixed to the side plate 1 and extending through an opening in the small side plate 200. The three right-hand wheels 204 (Fig. 18) are used for printing the date, one of the wheels carrying letters indicating the month, and the other two being tens and units wheels for days of the month. These three date wheels are carried by telescopically concentric shafts 205 (Fig. 18) that are mounted on shaft 204a and which extend through the small plate 200 where they carry three date indexing disks 206 by means of which the date wheels may be set. The date wheels are retained in adjusted positions by detents comprising spring-urged pawls 202 (Fig. 20) contacting ratchet wheels 204b fixed to the respective date wheels 204.

d. Consecutive numbering mechanism

The check receipts are consecutively numbered by means of the three left-hand type wheels 204 shown in Fig. 18. These wheels are rotatably mounted on the shaft 204a and automatically advanced to register a unit each time a check is issued by the means that actuates feeding mechanism that advances the check strip.

Referring to Fig. 19, each consecutive numbering wheel 204 has fixed to it a ratchet wheel 204c whose rotation in a counterclockwise direction is prevented by a spring-held detent pawl 202a. The ratchet wheels 204c are advanced by three fingers 207a (Fig. 18) on a member 207b pivoted on a shaft 207c carried by the upper arm of a bell crank lever 207 pivoted on the shaft 204a. The member 207b is urged clockwise in Fig. 19 by a spring 207d shown in Fig. 18. The lower arm of the bell crank 207 extends into the path of two studs 208 (Fig. 2) on the sector-like member 209 which is rocked clockwise and returned counterclockwise during a machine operation to actuate the check strip feeding mechanism presently to be described. The crank 207 is first rocked counterclockwise by the lower stud 208 (Fig. 2) near the end of the amount key depression and then said bell crank 207 is rocked clockwise near the end of the machine operation by the upper stud 208. As the bell crank 207 is rocked counterclockwise, the fingers 207a ride over the ratchet wheels 204c. Upon the clockwise movement of bell crank 207 the fingers 207a selectively advance the ratchet wheels 204c to increase the registration on the consecutive numbering wheels by one unit. The finger 207a for the units numbering wheel operates to move said wheel one step each time the bell crank 207 is rocked. The units order ratchet wheel 204 contains a deep notch 204d as shown in Fig. 19 which, when the units wheel moves to its tenth position, allows the units order finger 207a to move clockwise about its pivot 207c (Fig. 19) under the urge of its spring farther than it can move in the other positions of the units wheel. This lowers the fingers 207a to a position to permit the tens finger 207a to engage one of the notches in the ratchet for the tens order wheel, the finger for the tens order being the middle finger shown in dotted lines in Fig. 19. Accordingly, upon the next rocking movement of bell crank 207 the tens wheel will be advanced a unit. Said tens wheel will be advanced only one step, however, because, when the ratchet wheel 204c for the units order is moved to its next position, the next shallow notch in the units wheel will raise the fingers to a position such that only the units finger is active for another nine steps. When the tens ratchet wheel moves to its tenth position, the fingers can drop down still farther so that the hundreds finger, which is the top finger in dotted lines in Fig. 19, will be active to move the hundreds ratchet wheel one step. Thus, the necessary tens transfers are effected so that the consecutive numbering mechanism will properly register the consecutive numbers up to and including three digits.

The date and the consecutive number type wheels, being grouped together, will be called the "data type-carrying elements" in order to distinguish them from the "item" type wheels and the legend-carrying plate 203. If desired, a dash may be printed between the date and the consecutive number by the use of a disk 204' (Figs. 18 and 20) positioned between the two groups of type wheels 204. While a date and a consecutive number are the things usually desired, these "data type-carrying elements" can, of course, be formed with type to print other data if desired.

e. Printing impression mechanism

In order that clear printing impressions may be made from all the type-carrying elements necessary for printing on a receipt-check, a novel form of printing impression mechanism has been provided which is constructed, arranged and combined with the rest of the machine in such a way that the necessary impressions may be made without greatly increasing the force necessary for key depression, added to which certain other advantages and new results are obtained.

Figure 6:
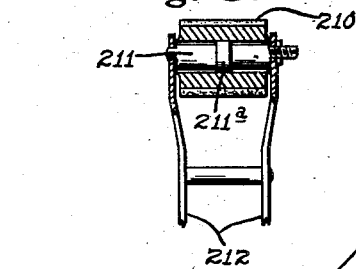
Fig. 6 is a detailed section through the platen roller.

Referring to Figs. 2, 3, 6 and 7, a rubber-faced roller platen 210 is rotatably mounted on the end of a relatively long arm 212, said arm being made of two pieces formed together as illustrated in Fig. 6. The arm 212 is pivoted at its lower end on the pivot 213 which is below the type-carrying elements and on a line that intersects the row of type-carrying elements substantially at the center of the row from front to rear. The roller platen thus swings in an arc having a long radius and the sets of type-carrying elements are positioned to correspond as will be evident from Fig. 7. The roller platen 210 is mounted on the arm 212 so that it may be easily adjusted to vary the intensity of the printing impressions and also so that it is self-aligning to give uniform impressions from all the type. For this purpose, the roller is mounted on a shaft 211 (Fig. 6) adjustably fixed in the end of the arm 212. The shaft has a centrally located eccentric rib 211a having a slightly larger diameter than the remainder of the shaft. The roller 210 has an internal bore whose diameter is substantially equal to that of the rib 211a. This mounting enables the roller platen to rock slightly about its central support to adapt itself to the faces of all the type. To adjust the roller to vary the intensity of the printing impressions, the shaft 211 is turned slightly to thereby change the position of the eccentric rib 211a, the shaft being locked in place by a nut on its end. This provides a simple, inexpensive mounting that nevertheless gives the required degree of adjustment and the proper flexibility to get uniform impressions from all the type.

The arm 212 is rocked counterclockwise from the position of Fig. 2 to that of Fig. 3 to roll the platen across the sets of type-carrying elements by force derived from depression of the amount keys. Pivoted on the shaft 6 of the machine, which extends to the right beyond the side plate 1, is an actuating arm 220 having a rearward extension 221 hooked over the universal bail 11, which bail extends to the right through a slot 221a in the right-hand side plate 1, this being the usual construction as shown in Pasinski 2,070,059. The arm 220 has a forward extension 222 connected by a spring 223 to a lug 224 on the rear end of a link 226. The link 226 is slidably mounted on a stud 225 carried by arm 220 and said link extends forward to where it is pivotally connected by a stud 227 to the upper arm of a bell crank 228 pivoted on shaft 214. The stud 227 is positioned in a slot 229 in the arm 212, the slot 229 being provided to enable the parts to have the required relative movement due to the fact that the arm 212 swings about a pivot, and has a vertical motion as will be explained.

Printing impressions must not occur until after the type-carrying elements have been indexed, and the "item" type wheels are not indexed until near the end of depression of the amount keys. To properly time the parts and also to obtain new and improved operation, the movement of the arm 212 with its roller platen 210 is prevented until the very last portion of the amount key depression by a bell crank latch 235 (Fig. 2) pivoted on a stud 236 on the side plate 1, said latch having a shoulder 237 on its forwardly projecting arm which normally is positioned in front of a lug 238 on the link 226, the latch being urged clockwise by a spring 235a. The upper arm of the bell crank latch 235 is positioned in the path of the actuating arm 220 so that, just as said arm reaches the limit of its forward movement, it strikes said latch 235 and rocks it counterclockwise (Figs. 2 and 3) to release the link 226 (Fig. 3).

With the above construction, when the universal bail 11 is moved forward by depression of the amount keys, the actuating arm 220 is rocked forward and the spring 223 gradually tensioned. Near the end of movement of arm 220, latch 235 is released whereupon the spring 223 suddenly moves the link 226 and the arm 212 with the platen roller 210 forward to thereby quickly roll the platen 210 across the sets of type-carrying elements, the full force of the spring 223 then being available for the purpose. The arm 212 carries a rubber bumper 215 that limits against a stud 216 on the side plate 1. This action enables clear printing impressions to be quickly made at the proper time without placing a heavy and non-uniform load on the keys. The mounting of the roller platen 210 on a long pivoted arm such as the arm 212 enables the platen to be moved across the type with a minimum force as distinguished from constructions in which the roller platen must be forced through cam slots or otherwise operated by parts that require considerable force. The use of a roller platen as distinguished from a hammer or pressure mechanism also enables the printing impressions to be made with a minimum force as distinguished from the relatively large force that would be required with such devices to make printing impressions from all the sets of type-carrying elements necessary in modern check-receipt printing. Instead of suddenly placing a load on the amount keys to operate the printing mechanism, the spring 223 is gradually tensioned during almost the entire key depression, with the result that no undesired peaks of resistance are encountered during depression of the keys through their full stroke. Yet, when the printing mechanism must be operated, the maximum force is available. At the beginning of the action of the spring, the roller platen is not in contact with any type. Thus, not much force is required to start movement of the platen arm. This arm, together with the associated parts operated by the link 226, gathers momentum before the roller platen engages the "data" type elements and this momentum assists in carrying the roller platen over said elements. The same action occurs between the sets of type-carrying elements, the momentum of the parts giving a fly-wheel type of effect and assisting in uniform operation as well as making the force required a minimum.

The above-described combination and arrangement of parts has contributed very largely to making check-receipt printing of the type described possible in a key-operated machine.

The actual printing impressions are made by means of an ink ribbon 320 shown in Fig. 2. This ribbon passes from a spool 321 around guide shafts 325 and 326, beneath the sets of type-carrying elements, and about a guide shaft 327 to another spool 322. The ribbon reels 321 and 322 are moved step by step by arms 323 and 324 that are actuated during each machine operation by an extension 95x of the arm 95b (Figs. 2 and 8) that operates the ribbon of the detail strip printer. A ribbon reverse 325 (Fig. 2) similar to that of the detail strip printer is also provided.

Figure 13:
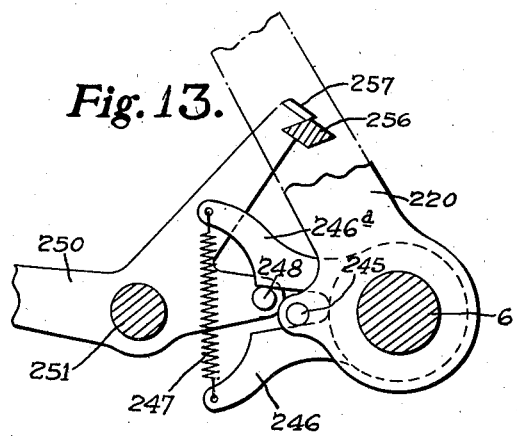
Fig. 13 is a fragmentary detail of a portion of the printing mechanism with the parts in position with a key partially depressed.

After the printing impressions have been made, the platen roller 210 is returned to normal while out of engagement with the type-carrying elements and this is done in a manner such that a minimum force is required, the force available being that of springs that are gradually tensioned during amount key depression. If considerable force were required, the amount key depression would be made correspondingly hard. To accomplish the result, the pivot 213 of the arm 212 is made in the form of an eccentric rockably mounted on a shaft 214 carried by the side plate 1. Normally this eccentric pivot occupies the position shown in Fig. 2 but, after printing impressions have been made, the pivot is rocked to the position of Fig. 3 which lowers the platen roller below the type-carrying elements. The lower end of the actuating arm 220 carries a stud 245 (Fig. 2) positioned between two scissor arms 246 and 246a that are pivoted on the shaft 6 and urged toward one another by a spring 247. Also positioned between these scissor arms is a stud 248 on the end of a lever 250 pivoted on a stud 251 on the side plate 1 and extending forward adjacent the eccentric pivot 213 where said lever is provided with a hooked end 252 having a slot engaging a stud 253 on a crank arm 254 connected to the pivot 213. As the actuating arm 220 is moved forward by depression of the amount keys, the stud 245 tends to rock the scissors 246—246a counterclockwise to thereby rock the lever 250 clockwise to move the eccentric pivot 213 to the position of Fig. 3. Such movement is temporarily prevented, however, by a diamond-shaped stud 256 on the actuating arm 220, which stud moves down into the path of a lug 257 on an upwardly projecting arm of the lever 250 as shown in Fig. 13. This occurs immediately upon the counterclockwise movement of actuating arm 220 with the result that the forward movement of said arm moves the scissors arm 246 downward while the arm 246a is blocked by the stud 248 (Fig. 13), thus tensioning spring 247. Near the end of the forward movement of the actuating arm 220, the stud 256 passes beyond the lug 257, whereupon the lever 250 is released. The spring 247, acting on the scissors arm 246a, quickly rocks the lever 250 clockwise to turn the eccentric pivot 213 from the position of Fig. 2 to that of Fig. 3 to thereby instantly lower the roller platen 210. The platen roller is thus free of the type-carrying elements. Very little force is then required to return the parts to normal as the roller platen is free and the parts are mounted so that only the swinging of long levers is involved. The return is accomplished by the universal bail 11 to which the actuating arm 220 is hooked, the universal bail being returned by the springs 84 and 14 shown in Fig. 8, which are tensioned during amount key depression and which act on arms 83 and 12 that engage bail 11.

Figure 14:
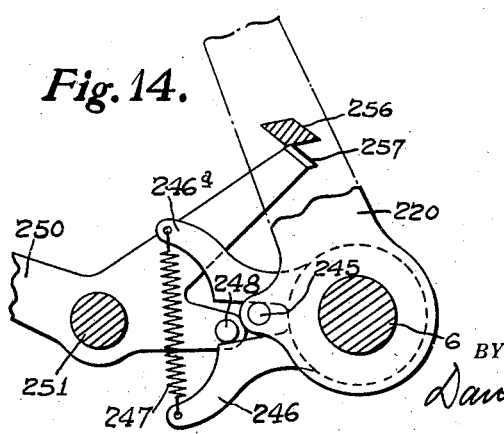
Fig. 14 is a view similar to Fig. 13 but with the parts in position with a key partially restored.

As the actuating arm 220 returns to normal, the diamond-shaped stud 256 passes over the lug 257 as illustrated in Fig. 14, thereby blocking the lever 250 against counterclockwise movement. The return movement of arm 220 moves the scissors arm 246a clockwise, but movement of arm 246 is prevented by stud 248, with the result that the spring 247 is again tensioned. Near the end of the return movement of actuating arm 220, the stud 256 passes beyond the lug 257, whereupon the lever 250 is released and the spring 247, acting on scissors arm 246, rocks the lever 250 counterclockwise to thereby return the eccentric pivot 213 to its Fig. 2 position. This moves the roller platen upward again to normal where it is ready for another forward movement to make printing impressions. In its normal position, however, the platen roller 210 is slightly back of the data type-carrying elements so there is ample space between said roller and said elements to permit a check strip to be easily inserted between them.

A further control of the lever 250 is provided in order to coordinate the rocking of the eccentric 213 with the position of the roller platen 210. For this purpose a latch 260 (Fig. 2) is provided which is pivoted at 261 to the side frame 1 and urged counterclockwise against a limit stud 262 by a spring 263, in which position the latch overlies the forward end 264 of the lever 250 as shown in Fig. 2. This latch prevents clockwise movement of the lever 250 until the link 226 has moved forward to a position where the platen roller 210 has finished making the printing impressions. Near the end of the movement of the link 226, the arm 228 engages the latch 260 and rocks it clockwise until it clears the upper end of the projection 264 of lever 250. Thus, the lever 250 cannot move until the arm 212 carrying the platen roller has moved to make printing impressions. On the return of the parts to normal, the latch 260 is released, but it does not interfere with the return of the lever 250 counterclockwise to normal, as the upper end 264 of said lever is shaped so that it will pass the latch.

*f. Check strip mechanism*

The check strip comes in the form of a large supply roll R wound on a small wooden spool that is rotatably mounted on a stud 270 supported by the right side plate 1 of the machine. It is highly desirable, in a machine of this kind, to have as large a supply of check strip as possible in order that the operator need not be constantly replenishing the supply. One of the advantages of the present invention is that an unusually large check strip supply roll may be used. This is due to the location of the supply roll and to the manner in which the strip is taken from the roll such that the size and weight of the roll does not make the force required for key depression unduly hard nor interfere with proper operation. The paper used is preferably about .003" thick and this enables a roll to be used that is between 650 and 700 feet long, a length greatly in excess of any capacity heretofore possible.

The check strip passes from the supply roll over the roller platen 210, and under the ink ribbon 320 which is directly beneath the sets of type-carrying elements 68, 203 and 204, from where it passes to a check strip feeding means presently described. In order to pull a supply of check strip from the roll, it is necessary to start the roll rotating, which requires an appreciable amount of force. The strip cannot be fed to a check issuing position until after printing occurs and printing does not occur until near the end of key depression which means that the force available for moving the check strip is that of the return of the machine to normal under the urge of springs, and these springs must be as weak as is possible in order not to increase the force necessary for key depression. Also, after rotation of the roll has been started, it tends to keep on rolling which, if allowed to occur, would cause an undesired amount of check strip to be unwound from the roll. To prevent this, a brake for the supply roll is usually provided, but if the check strip is jerked off the supply roll immediately after the printing operation, a rather firm brake must be used on the roll, which means further load on the amount keys. This problem has been solved by a very simple construction that not only promotes ease and uniformity of operation but which also makes it possible to eliminate numerous guides and tension devices that otherwise are necessary to keep the paper taut across the printing line. The improvement also makes the check strip much more accessible than in prior constructions as will presently appear.

Referring to Fig. 2, a long arm 275a is pivoted on the stud 236, said arm being positioned fairly close to the side plate 1 and carrying a long stud 275 on its upper end projecting outward and positioned above the check strip as shown in Fig. 2. Also pivoted on the stud 236 is a member 276 having a slotted end astride a stud 277 on the actuating arm 220. The member 276 carries a stud 276a positioned under the edge of the arm 275a and connected to this stud is a spring 278 whose upper end is connected to a stud carried by the arm 275ᵃ. This provides a yielding connection between the arm 276 and the arm 275ᵃ.

When the actuating arm 220 is rocked forward, the stud 277 rocks the member 276 clockwise and said arm, acting through the spring 278, rocks the arm 275ᵃ clockwise. Upon the return movement of the arm 220, its stud 277 returns the member 276 counterclockwise, whereupon the stud 276ᵃ engages the edge of the arm 275ᵃ and restores it to normal.

It will be recalled that the actuating arm 220 is rocked forward by depression of the amount keys. Accordingly, during depression of the amount keys, the arm 275ᵃ is rocked clockwise from its full-line to its dot-dash position of Fig. 2. As this occurs, the stud 275 on the upper end of said arm engages the check strip and slowly pulls a quantity of strip from the roll R as illustrated in Fig. 3. A friction brake 271 for the supply roll is provided to prevent overrunning but, because the strip is pulled off slowly during key depression, the brake need not be as great as if the strip were jerked off the roll at the time the check is issued. The brake comprises a spring member 271 pivoted on a stud 272 on the side frame 1, the brake being urged counterclockwise in Fig. 2 by a spring 273. The brake has side lugs 274 that tend to hold the supply roll in position on the stud 270 as well as to apply a certain amount of friction to prevent over-rotation of the roll.

The pulling action on the check strip by the arm 275ᵃ with its stud 275 is against the grip of the check feeding mechanism described later which holds the forward end of the strip. The pull is also against the inertia of the supply roll R and the resistance of the friction brake 271. Several important results follow. First, a quantity of check strip is pulled slowly from the supply roll while the amount keys are being depressed, and substantially throughout the entire key depression, so that the force required for the operation is distributed. Since this does not require rapid rotation of the supply roll, the brake 271 need not be as strong as if the check strip were jerked off suddenly. In addition, the pull of the stud 275 on the check strip against the grip of the feed rolls at the front of the machine pulls the strip taut across the printing lines of the several type-carrying elements, which is a highly desirable condition for uniform impressions. As shown in Fig. 3, the platen roller 210 is in its forward position but, at the time printing impressions start, said roller is in its rear position and the pull of the stud 275 on the check strip pulls said strip to a taut and substantially horizontal position under the type-carrying elements as will be clear by referring to Fig. 2. This eliminates the necessity for guides and for a spring tension device to maintain the paper taut across the printing line during printing impressions, which devices have heretofore been necessary, particularly with hammer impression printing. And the elimination of these guides and tension devices makes the check strip much more accessible and easier to place in position when a new supply roll is placed in the machine. Practically no resistance is offered to the initial movement of the amount keys because there is always a slight slack in the check strip and the first movement of the arm 275ᵃ is to take up this small slack, after which, the amount keys having started in their movement and gained momentum, the arm 275ᵃ begins to tighten the check strip and gradually pull it from the supply roll.

It is to be noted that the pull on the strip is exerted directly on the roll and tangentially thereto. This requires much less force than if the strip had to be pulled off the roll by the forward pull of the feeding mechanism, in which case the strip would have to be turned half way or more around a guide which would have the effect of putting a bight in the strip. In such event, a small resistance by the roll has to be overcome by a very heavy feeding pull.

The spring 278 between the member 276 and the arm 275ᵃ insures a uniform pulling action on the check strip. For example, if the amount keys are depressed too suddenly, the spring 278 will yield and prevent the producing of too much slack in the strip. This also makes possible the employment of a weaker brake on the spool. If the paper were jerked from the spool, the brake would have to be strong enough to offset the jerk. Also, this arrangement is self-compensating as between large and small size rolls, each roll gradually becoming smaller as the strip is unwound. First it will be noted from Fig. 2 that the path of movement of the pin 275 on arm 275ᵃ is such that substantially the same amount of check strip is pulled off the supply roll no matter what the size of the roll. When the roll is large, this supply can be pulled off by a relatively small and slow movement of the roll. At this time the inertia to be overcome in starting the roll and the momentum to be overcome in stopping it are at their maximum. But the lever on which the pull acts, namely the radius of the roll, which is also the lever on which the brake acts, is at its maximum. As the keys are depressed, the spring 278 may stretch to take up the shock of too sudden depression, and to enable the slow and small movement of the roll to follow. This slow and small movement, as well as the long radius of the roll, enables a light brake action to be used and not a great deal of force is necessary to pull the strip off the roll. The stretch of the spring applies this force but does not apply it too suddenly and thus start the roll too rapidly. As the roll becomes smaller, its inertia becomes less and it must be moved farther to pull off the same amount of strip. At this time the brake operates through a shorter radius, but this is more than compensated for by the smaller mass of the roll. When the keys are depressed with a small roll, the spring 278 may stretch though it is not so likely to do so owing to the fact that there is less inertia to be overcome in starting the roll and the roll may rotate faster in the pulling-off action while at the same time it can be stopped quite easily by the brake owing to the smaller mass.

The net result is that this combination and arrangement of parts enables the required amount of the check strip to be pulled off without requiring much force, no matter whether the roll is large or small and the brake is effective in all cases. The yielding connection insures that substantially the same amount of force will be applied in each case and that it will not be applied too suddenly in the case of a large roll nor in any case, if the keys are depressed too rapidly.

Figure 12:
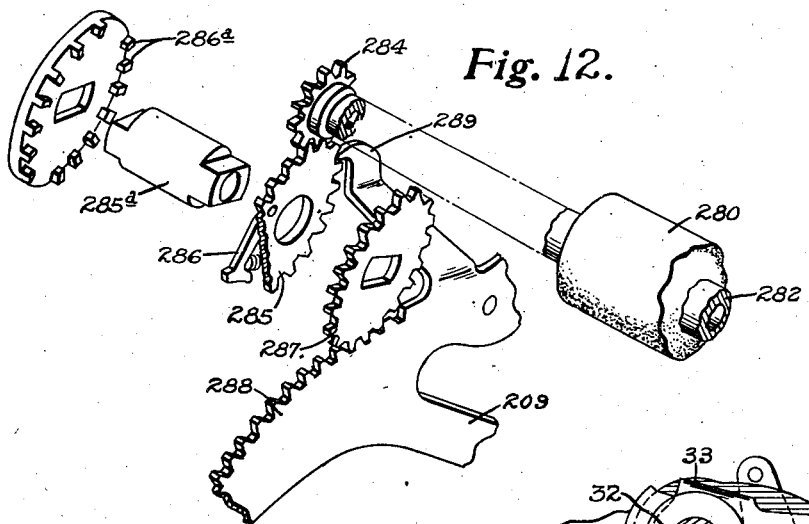
Fig. 12 is a spread perspective of portions of the paper feeding mechanism.

The check strip is fed forward to a new printing position and to a check issuing position by means of a pair of feed rolls which pull the strip past the type-carrying elements as distinguished from pushing it. The lower feed roll 280 (Fig. 2), which is the driven roll, is carried by a sleeve 282 (Fig. 7) journaled on a stationary shaft 283, fixed to the side plate 1. The sleeve 282 carries a gear 284 (Figs. 2 and 12) meshing with a gear 285 journaled on a bushing 285ª (Fig. 12). The gear 285 supports a spring-urged pawl 286 positioned to engage the teeth of a ratchet wheel 286ª which is mounted on the bushing 285ª to rotate with it. Also mounted on the bushing 285ª to rotate with it is another gear 287 meshing with the teeth 288 of the sector-like end of lever 209 pivoted on a stud 291 fixed to the side plate 1. The arrangement is such that, when the lever 209 is rocked clockwise (Fig. 2), it rotates the gear 287, the bushing 285ª, and the ratchet wheel 286ª counterclockwise (Figs. 2 and 12). During this movement, the teeth on the ratchet wheel 286ª pass pawl 286. However, when the lever 209 is moved counterclockwise, the gear 287, bushing 285ª and ratchet wheel 286ª are moved clockwise, whereupon one of the teeth of the ratchet wheel 286ª engages the pawl 286 and rotates the gear 287 clockwise to thereby rotate the gear 284 and the feed roll 280 in a counterclockwise direction (Figs. 2 and 12).

The lever 209 is rocked by means of a roller stud 292 (Figs. 2 and 3) on its lower end which is acted upon by a cam slot 293 in one arm of the bell crank 228 pivoted on stud 214 and having its other arm connected to the link 226 by stud 227. The bell crank 228 is first rocked counterclockwise by the forward movement of the link 226 during depression of the amount keys and then returned clockwise to normal. During the forward movement of the link 226, the cam slot 293 acts to rock the bell crank 228 clockwise to move lever 209 in the same direction. During this movement, no rotation of the feed roll 280 occurs because the pawl 286 of the pawl and ratchet mechanism simply rides over the teeth of the ratchet wheel 286ª. But, during the return movement of the link 226, the cam slot 293 rocks the lever 209 counterclockwise, whereupon the feed roll 280 is rotated counterclockwise in Fig. 2. This action does not occur until after the roller platen has been moved forward to make the printing impressions.

In order to prevent the feed rolls from being rotated while the check is being torn off, a finger 289 (Fig. 2) is provided on the sector-like upper end of lever 209, which finger engages the teeth of the gear 285 as shown in Figs. 2 and 12 to lock the roll against rotation. This finger also prevents overthrow of the feed rolls as its acts to stop their rotation when the parts return to normal, at which time the check strip has been fed the proper amount to permit the check to be torn off.

The upper feed roll 281 is in the nature of a pressure roll. It is journaled on a shaft 300 (Fig. 5) fixed in an arm 301 pivoted on the type wheel shaft 69 and urged counterclockwise in Fig. 5 by a fairly strong spring 302 having one of its ends attached to a finger 303 of the arm 301 and its other end attached to a pin 304 projecting from the side plate 1. The spring 302 urges the upper feed roll 281 into contact with the lower roll 280 so that when the latter is rotated the check strip will be fed forward. The upper feed roll 281 may be moved upward to separate it from the lower roll 280 to permit easy insertion of a new check strip by swinging the arm 301 upward against the tension of spring 302.

A tear-off blade 306 is provided against which the check strip is jerked upward to tear off the checks. This tear-off blade should also be movable out of the way to permit easy insertion of the check strip. In the present invention, the operator can move both the upper feed roll and the tear-off blade by simply grasping the tear-off blade, which projects slightly through the casing of the machine as shown in Fig. 2, and moving it upward. However, since the check strip is torn off against the blade 306 by an upward jerk, provision must be made to prevent the tear-off blade from being moved upward when the check is torn off.

Referring to Fig. 5, the tear-off blade 306 is carried by a yoke having two arms 307 and 308 pivoted on the upper feed roll shaft 300. The lower end of the left arm 307 has a forked end normally positioned astride the sleeve 282 of the lower feed roll 280, which sleeve cannot move bodily and which is locked against rotation at the time the check is torn off by the projection 289 that engages gear 287 meshing with gear 284 on the sleeve. The rear portion 307ª of this forked end is cam shaped and so proportioned that a substantial upward pull is required on the tear-off blade 306 before the cam portion 307ª can be caused to move on the roller 282. This resistance is sufficient to prevent the tear-off blade from being moved upward when a check is torn off. But, if the operator pulls upward on said blade with his finger, he can raise it. As the tear-off blade is moved upward, the cam projection 307ª, acting on the sleeve 282, forces the arm 301 upward about its pivot. This moves the shaft 300 upward and carries the rear end of yoke 306—307—308 upward. The projection 307ª is carried upward also, and it moves to a position where it passes the sleeve 282, thereby permitting the tear-off blade to be swung upward about the shaft 300 to the dot-dash position of Fig. 2. Thus, while the upper feed roll is moved upward sufficiently to separate it from the lower roll, the tear-off blade may be moved farther to put it entirely out of the way and to accomplish another result presently to be explained. After the cam portion 307ª has passd the sleeve 282, the upper feed roll and the tear-off blade are prevented from moving back to normal under the urge of spring 302 by the engagement of the projection 307ª with the top of the sleeve 282, but the operator can return these parts to normal by pressing downward firmly on the tear-off blade.

The side arms 307 and 308 forming the yoke supporting the tear-off blade 306 are bent downward as shown in Figs. 2 and 5, to form side guides for the check strip. This is best shown in Fig. 2 where it will be observed that the side of the arm 308 is below the line of the check strip. The extra movement of the tear-off blade heretofore described enables these side arms to be moved high enough to put them above the line of the check strip so that they will not interfere with the side insertion of the strip. Thus, it will be seen that a combination side guide, tear-off blade, and feed roll unit has been provided that provides for efficient feeding of the check strip and which permits all of the parts to be moved by gripping the tear-off blade. And the tear-off blade constitutes a releasable cam lock for holding the parts in normal as well as separated position.

Figure 1:
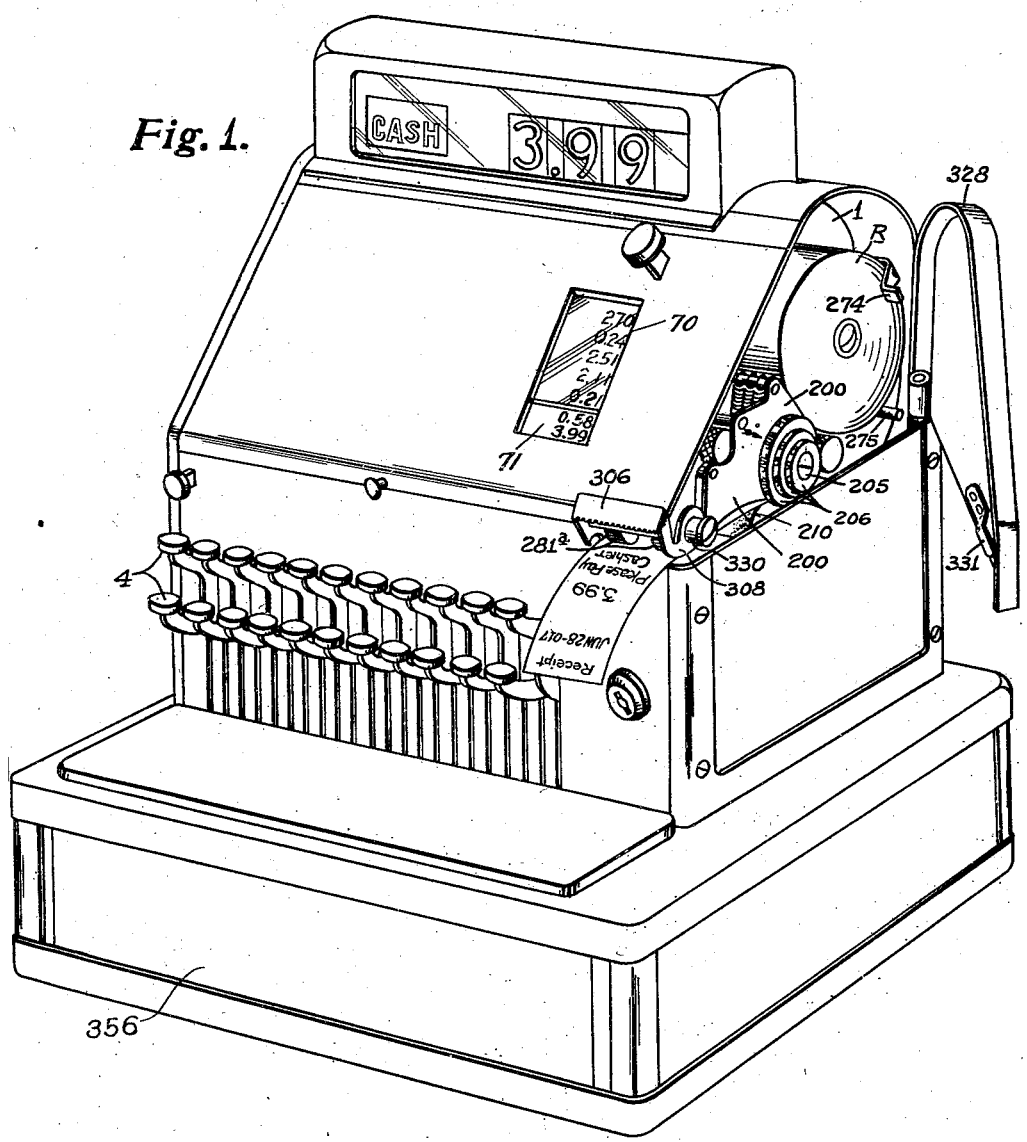
Figure 1 is a front perspective of a key-operated cash register embodying this invention and in which the side panel is open to illustrate the receipt printing mechanism.

This same unit also performs an additional function, namely that of locking and unlocking the side cover that encloses the receipt printer. Referring to Fig. 1, the upper part of the right-hand side panel of the machine is provided with a hinged portion 328 which swings outward about a pivot at the rear. Fixed to the inner forward side of this cover is a finger or keeper 331 which, when the cover is closed, is directly under a slot 330 (Figs. 1 and 5) formed in the outer end of the upper feed roll shaft 300. When the upper feed roll is in normal position, this slot is over the keeper 331 and the side cover 328 is locked closed. When the tear-off blade is grasped and pulled upward, which cams the feed roll shaft 300 upward, said shaft moves to a position to free the keeper 331 and thus unlock the side panel cover. This makes it unnecessary for the operator to manipulate a lock or a latch to open the casing to obtain access to the receipt printer. He has no occasion to get at the receipt printer except when he desires to replace the supply roll or adjust the strip and, for both of these operations, the upper feed roll should be separated from the lower one and the tear-off blade should be in its upper position. Consequently, when he moves these parts to the position they should occupy, the side cover is automatically unlocked and he can swing it open. The tear-off blade thus locks and unlocks the side panel as well as acting as a means for moving the upper feed roll to its positions and releasably latching the roll in its positions.

The upper feed roll 281 is mounted in a novel manner to promote a straight and uniform pull on the check strip. Referring to Fig. 4, the shaft 300 is provided with a centrally located rib 310 having a larger diameter than the main portion of the shaft. The bore of the upper roll 281 has a diameter substantially equal to the diameter of this rib. Toward each of its ends, the shaft 300 is provided with elliptical ribs 311 having a diameter in a horizontal direction substantially equal to that of the central rib but a considerably reduced diameter in a vertical direction. This mounting permits the ends of the feed roll 281 to rock up and down slightly relative to shaft 300 but does not permit them to move appreciably backward and forward relative to said shaft. In other words, the upper roll can rock slightly about rib 310 in a vertical plane through the longitudinal axis of shaft 300 but cannot move appreciably in a horizontal plane through said axis. The knurled or gripping portions of the feed roll are in the form of two knurled outer ribs 281a positioned toward the outer ends of the feed roll 281. The upper feed roll may adjust itself so that the pressure of the two ribs on the check strip is equalized to thus cause the same pull to be exerted on the two sides of the strip thereby tending to pull the strip straight forward.

Figure 21:
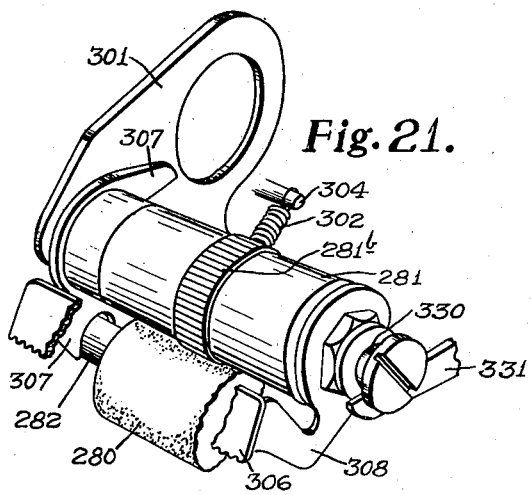
Fig. 21 is a partial perspective of a modified form of check strip feeding mechanism.

Another form of construction for the upper feed roll is shown in Fig. 21. In this form the feed roll 281 is simply journaled on the shaft 300 without any special mounting. A single knurled outside rib 281b is centrally located on the feed roll so as to exert a center pull on the strip. It has been found that this center pull not only tends to pull the strip straight forward, but it tends to bring it back into proper alignment between the side guides 307 and 308 when the check has been skewed slightly by tearing off a check in an incorrect manner. Also, this construction avoids the expense of a special mounting and eliminates the necessity for the careful adjustment of the construction shown in Fig. 4.

The check strip mechanism not only makes the check strip more accessible than in prior constructions, but it also almost entirely eliminates the jamming of the strip, a difficulty that has been encountered in prior machines. The location of the receipt printing mechanism on the outside of the side plate makes the entire mechanism generally accessible. Next, it will be noted that, in the normal position of the parts shown in Fig. 2, there are no obstructions beneath the sets of type-carrying elements. The roller platen 210, while slightly beneath the "data" type-carrying elements, is separated from them and slightly to the rear. This is in contrast to prior mechanisms where the platen and other parts are directly beneath the type-carrying elements, leaving only a minute space into which the check strip must be carefully and tediously pushed or threaded. The absence of a strip tensioning device other than the stud 276, and of a plurality of guide rolls, makes it a simple matter to place a new check strip in position. It is not necessary to thread the strip around a spring-held inaccessible tension device or around a plurality of staggered guides. The check strip is simply brought around the stud 275 (Fig. 2) and then inserted from the side in position over the roller platen 210. At the time, the feed rolls, the side guides 307 and 308, and the tear-off blade 306 are in an elevated position where they do not interfere with the side insertion. In other words, all the operator has to do is to put a supply roll on the stud 270 and then pull a small part of the check strip off and insert it in position from the side over the platen roller and between the feed rolls, after which he closes the cover, pulls the tear-off blade down, and the machine is ready for operation. The absence of complicated mechanism also makes it easy to place a new supply roll in position and this may be a large roll because of the ample space available because of the absence of numerous parts in the part of the machine where the roll is located.

This construction also tends to prevent jamming. In the first place it is not necessary to pull the check strip against a tension device or around rolls or guides against the sides of which the strip tends to jam. Instead, all that the feed rolls have to do is to pull a loose part of a check strip forward and this does not require the rotation of the supply roll. The amount of check strip required has already been pulled off and all the feed rolls have to do is to pull a very light piece of paper forward. This pulling may be slightly resisted by the arm 275a, but it is a light metal part that offers no substantial resistance; besides, while the strip is being pulled forward, the operation of the machine tends to restore the arm 275a to normal independently of the strip and the parts may be proportioned so that the arm offers no resistance whatever to the strip. Combined with the above advantages is the fact that the check strip is moved by a pulling action as distinguished from pushing and that the only guides for it are the two side guides adjacent the feed rolls. Also, there is a center pull on the strip so that, if the check is skewed slightly at the front end by having been torn off wrong, it need not ordinarily be straightened out because the center pull tends to automatically pull the strip back to proper position and the incipient jamming is automatically straightened out by the feeding mechanism itself. There is nothing behind the pull-feeding mechanism in which the check strip can jam, the stud 275 tending to keep the strip sufficiently taut to be in proper alignment. And the feeding mechanism can be operated by a small force since it is not necessary for it to pull a strip off a roll and around a guide.

These features of ready accessibility and non-jamming are highly important from the standpoint of the user. It means that he can put in a new supply of check strip quite easily and likewise it means that his machine does not jam and require that he poke about between closely located parts trying to push the paper out with a knife. Instead, if a jam should occur for some extraordinary reason, the check strip is easily accessible and can be quickly straightened out by jerking up the tear-off blade, swinging open the cover, and adjusting the strip which is in a freely accessible position. The ease of operation is another factor making possible the use of a check strip printer on a key-operated machine.

Figure 15:
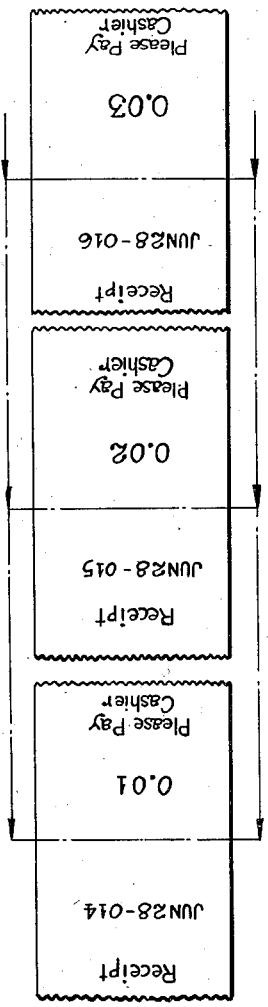
Fig. 15 illustrates a sample check-receipt illustrating the relation in which the imprints are made.

While the type-carrying elements are positioned close to the front of the machine, there is necessarily some distance between the "item" type wheels and the point where the check strip is torn off by the tear-off blade. Accordingly, unless something is done to prevent it, there would be a substantial waste of paper on each receipt due to the fact that each receipt would have to be of a length not only to take the printing impressions but the added length of the distance between the "item" type wheels and the tear-off blade. In order to reduce this waste, the type-carrying elements are arranged in the order previously described and the paper feed is arranged to feed the check strip just enough so that, when the check is torn off, the line of separation is between certain of the legends printed by the printing plate. This will be clear from Fig. 15 where the increments of check-strip-feed are indicated by dot-dash lines and arrows. As will be observed, each check ends with one-half of the legend at the bottom, which would be at the top viewing the check from the operator's position. This leaves the check strip in the machine with a portion of the legend, such as the name of the proprietor, the date, and the consecutive number already printed. By this arrangement a check of the smallest possible size and involving practically no waste paper is issued at each operation of the machine.

It is to be observed that the check is issued in such a manner that, when the operator grasps the end of it projecting toward him, he can hand the check to a customer without reversing it and the check will be right side up as far as the customer is concerned. The figures on the detail strip, which are also those printed on the check, appear directly before the operator and in correct position for easy reading through the window 70 (Fig. 1). The operator doesn't have to shift the check around and look at it before handing it to a customer.

INTERLOCKS

The machine is provided with a control lever 335 illustrated and described in detail in my prior Patent No. 2,070,063 for controlling the locking of the amount keys and the locking of the cash drawer under certain prescribed conditions. This lever has three positions as indicated by the notches in the plate 337 in Fig. 2. It is normally concealed and protected by the front hinged panel 336 which is under the control of a lock having a key normally in the possession of the proprietor or auditor as distinguished from the operator. It is undesirable to make it possible for the operator to manipulate this control lever without authority and, hence, provision is made for making it impossible to move the lever when the side panel 328 is open. Referring to Fig. 2, an arm 340 is pivotally connected to the upper end of the control lever 335, said arm terminating at its rear in an enlarged portion having a slot 341 in it provided with three notches 342. A stud 343, fixed to the side plate, is positioned in the slot 341. The front cover 336 has a side arm 344 shown in dot-dash lines in Fig. 2 having a stud 345 at its rear end operating in a slot 345ª in the side plate 1. When the front cover 336 is in its closed position, the stud 345 occupies the full-line position of Fig. 2, where it engages the upper edge of the arm 340 and maintains said arm in a position such that one of the notches 342 engages the stud 343. Accordingly, as long as the front cover 336 remains closed, the control lever 335 cannot be moved even if the side panel 328 is open. But, if the front panel 336 is raised, the stud 345 moves to the dot-dash position of Fig. 2 and the arm 340 is free so that its control lever can be operated.

The machine is also provided with means for releasing the cash drawer whenever the front hinged cover 336 is raised, as described in my prior Patent 2,070,063. This is accomplished by means of a link 357 shown in Fig. 2, which is the link 57 of said prior patent. When the side cover 328 is swung open, the link 357 is exposed and in order to prevent the operator from opening the cash drawer in an unauthorized manner, the link 357 is formed with a hooked upper end 359 engaging over the stud 345 as shown in Fig. 2. As long as the front cover is closed, this stud prevents the link 357 from being moved downward to open the cash drawer even through the side cover 328 is opened. But, when the front panel 336 is raised, the stud moves to the dot-dash position and the link 357 is freed.

OPERATION

As far as the operator is concerned, the only thing that he needs to do in operating the machine to enter an item is to depress the keys and then tear off the check. The mechanical operation of the mechanism is, briefly, as follows:

As the amount keys are depressed, the springs for restoring them and the other parts of the machine to normal are gradually tensioned. The registering mechanism and the indicating mechanism are operated and the "item" type wheels are indexed. The load on the keys is uniform and very light. Also, as the keys are depressed, the record strip is moved from a visible to a printing position and the hammer for the record strip printing mechanism is gradually tensioned and later released near the end of the key depression. Also, as the keys are depressed, the spring 223 for operating the roller platen printing mechanism is gradually tensioned and then released near the end of the key depression. Likewise, the proper amount of check strip is pulled off the supply roll so as to be free for feeding as the machine is returned to normal. As the keys are returned to normal, the record strip is returned to a visible position, the check strip is fed forward, the platen roller is returned to normal, and the various other parts of the machine are restored, all the mechanisms being so constructed and arranged that very little force is required for their return, making it unnecessary to tension strong springs during the key depression. The total result is that it has been possible to provide a machine having a light key depression that will not only operate the ordinary mechanisms of the cash register but which also will print and feed a detail-record strip and also print and feed a check strip and in which there is printed on the check strip a plurality of items such as the amount of the item, various legends printed from a printing plate, the date, and the number of the check.

In addition, the operator may quickly replace the record strip as well as the ink ribbon for said strip even though these parts are located in a recess within the body of the machine and inside of the right-hand side plate. The operator may very quickly and easily place a new supply of check strip in position without the necessity of threading the strip around guides, through tension devices and between closely positioned printing elements. Both the detail-record strip and the check strip are arranged so that the paper is fed in a manner to prevent jamming, such strips having feeding devices that automatically tend to straighten out the strips in the event an incipient jam starts. And if there is any necessity for getting at the check strip it is easily accessible without interference from printing mechanisms or other obstructions below the type-carrying elements and without there being a place where the paper can seriously jam requiring the use of an instrument to get out the torn pieces of paper.

These results have been obtained in a relatively simple, inexpensive construction yet one that accomplishes a result not heretofore attained, namely, a cash register that will print on a detail strip and issue a receipt while at the same time being operable by light key depression. Added to this is the fact that both the detail-record strip and the receipt strip are much more accessible than in any machine heretofore produced, thus increasing the usability of the machine for the customer.

I claim:

1. The combination in a cash register of the class disclosed having a plurality of sets of type carriers and a roller-platen type of printing mechanism; of means for supporting the roller-platen so that it may be moved across the faces of the sets of type carriers to make printing impressions, means for mounting said platen roller on said supporting means comprising a shaft carried by said supporting means having a centrally located eccentric rib on it of greater diameter than said shaft, said roller-platen having an opening therethrough in which said shaft is positioned which opening has a diameter substantially equal to that of said rib, and said shaft being rotatably adjustable and provided with means for holding it in different adjusted positions whereby said eccentric rib may be adjusted to vary the position of said roller-platen to vary the intensity of the printing impressions.

2. In a cash register check printing and issuing mechanism comprising a plurality of type carriers, a check strip supply means at one side of said carriers; a check-strip moving means at the side of said type carriers opposite said supply means for pulling said check strip past said carriers and comprising a pair of rolls one of which has a narrow strip-gripping surface engaging said check strip substantially along its longitudinal center line while leaving the major portion of said strip toward each of its side edges free, whereby a pull is exerted on said strip tending to move it in a straight line past said type carriers and tending to bring it back into said line when inadvertently moved out of line, and means for rotating said rolls.

3. The combination in a cash register of the type disclosed of a check-strip printing mechanism comprising a plurality of sets of type carriers arranged substantially in line, a check-strip supply means at one end of said line, a printing impression means, a check-strip moving means at the other end of said line, a pair of side guides adjacent said moving means, said strip being substantially free of side guides between said supply means and said moving means, said moving means comprising a pair of rolls one of which has a narrow strip-gripping surface engaging said strip substantially along its longitudinal center line while leaving the major portions of said strip toward its side edges free, whereby, when said check-strip moving means is operated, a center pull is exerted on said check strip tending to maintain said strip substantially equally spaced between said side guides and to pull it back into line when inadvertently moved out of line by the removal of a check.

4. The combination in a cash register of the type disclosed of a check-strip printing mechanism comprising a plurality of sets of type carriers arranged substantially in line, a check-strip supply means at one end of said line, a printing impression means normally spaced a substantial distance from said type carriers, a check-strip moving means at the other end of said line, means operated during an operation of said machine to pull a quantity of check strip from said supply means prior to operation of said moving means, means operating during said machine operation to actuate said moving means after a portion of said check strip has been pulled off said supply means, said moving means comprising a pair of rolls one of which has a narrow surface engaging said strip substantially along its longitudinal center line while leaving the major portion of said strip toward each of its side edges free, whereby, when said moving means is operated, a center pull is exerted on said check strip tending to maintain said strip centered with respect to said strip-engaging surface and to pull it back into line when inadvertently moved out of line by the removal of a check.

5. In a key-operated cash register having depressible keys, a plurality of type groups with their type faces in a cylindrical surface, an arm pivoted to swing about the axis of said cylindrical surface, a roller platen on said arm, means actuated by said keys to swing said arm in one direction to roll said roller platen on said type faces and in the opposite direction to return said platen to normal, and means actuated by said keys to shift said arm radially of said surface to shift said platen away from said surface toward said axis between swings of said arm in said first and second directions and returning said platen toward said plane prior to the next swing of said arm in said first direction.

6. In a key-operated cash register having depressible keys, a plurality of type groups with their type faces in a cylindrical surface, an arm substantially radial to said surface, a roller platen carried on said arm for rotation on an axis substantially parallel to the axis of said surface, an eccentrically rotatably mounted bearing adapted by its rotation to shift said arm and platen against and from said surface, means actuated by said keys to swing said arm in one direction to roll said roller platen on said type faces and in the opposite direction to return said platen to normal, and means actuated by said keys to rotate said eccentric bearing to shift said platen away from said surface between swings of said arm in said first and second directions and returning said platen toward said plane prior to the next swing of said arm in said first direction.

7. In a key-operated cash register having depressible keys, a succession of type groups with their type faces in a common surface, a roller platen mounted for rolling across the faces of said type groups in succession, means to receive and store power from said keys gradually throughout a major portion of their depression stroke, connections from said power-storing means to roll said roller platen on said type faces, and means controlled by said keys to enable said connections to roll said platen on said type faces relatively near the end of the key stroke.

8. In a key-operated cash register having depressible keys, a plurality of type groups with their type faces in a cylindrical surface, an arm substantially radial to said surface, a roller platen carried on said arm for rotation on an axis substantially parallel to the axis of said surface, a bearing for said arm movable to shift said arm and platen against and from said surface, means actuated by said keys to swing said arm in one direction to roll said roller platen on said type faces and in the opposite direction to return said platen to normal, and means actuated by said keys to move said bearing to shift said arm radially of said surface to shift said platen away from said surface between swings of said arm in said first and second directions and returning said platen toward said surface prior to the next swing of said arm in said first direction.

9. In a key-operated cash register having depressible keys, a plurality of type groups with their type faces in a common surface, a roller platen mounted for rolling across the faces of said type groups in succession, means to receive and store power from said keys gradually throughout a major portion of their depression stroke, connections from said power-storing means to roll said roller platen on said type faces, and means controlled by said keys to enable said power-storing means to operate said roller platen relatively near the end of the key stroke, said type groups being spaced apart successively in the direction of movement of said roller platen and the latter being normally positioned substantially ahead of the first type group encountered by it in its movement.

10. In a key-operated cash register having depressible keys, a plurality of type groups with their type faces in a common surface, a roller platen, a pivoted arm carrying said roller platen and swingable to roll said platen across the faces of said type groups in succession, means to receive and store power from said keys gradually throughout a major portion of their depression stroke, connections from said power-storing means to swing said arm to roll said roller platen on said type faces, and means controlled by said keys to enable said power-storing means to so swing said arm relatively near the end of the key stroke, said type groups being spaced apart successively in the direction of movement of said roller platen and the latter being normally positioned substantially ahead of the first type group encountered by it in its movement.

11. In a key-operated cash register having depressible keys, a plurality of type groups with their type faces in a common surface, a roller platen, movable means rotatably supporting said roller platen, and means powered by said keys to move said support, said key-powered means including portions to move said support to move said roller platen in opposite directions parallel to said surface, portions to move said support to shift said roller platen into tangency with said surface between a movement in one direction parallel to said surface and movement in the opposite direction and to retract said roller platen from tangency with said surface between a movement in said opposite direction and a movement in said one direction, whereby said platen is rolled on said type faces by said movement in said opposite direction and is clear of said type faces in said movement in said one direction, and portions to receive and store power from said keys during a major portion of a key-depression and rendered effective late in said key-depression to energize said first-mentioned moving portions to move said support in said opposite direction to roll said platen on said type faces.

12. In a check printing and issuing cash register, a plurality of groups of type, a roller platen, a check-strip supply means at one side of said type groups, a check-strip feeding and issuing means at the opposite side of said type groups and gripping the check strip, means to engage said check strip between said supply means and the nearest of said type groups, and means to operate said check-strip-engaging means to strip a quantity of check strip from said supply means and tension the check strip across the type, to roll said roller platen on said check strip and press said check strip against said type faces while the check strip is tensioned across the type and immediately thereafter separate said roller platen and type faces, to return said check-strip-engaging means to normal to create slack in said check strip, and to operate said feeding means subsequently to issue the printed check while said check strip is slack and said roller platen separated from said type faces.

13. In a key-operated check-printing and issuing cash register having depressible amount keys, means powered from said keys during depression thereof to return depressed keys to normal when released, and operating means actuated by said keys, a plurality of groups of type, a check-strip supply means at one side of said type groups, means operated by said operating means during a major portion of said key depression to act on said check strip between said supply means and the nearest of said type groups to tension said check strip across said type faces and pull a quantity of check strip from said supply means and to return said check-strip-engaging means to normal during return of said depressed keys to normal to create slack in said check strip, a roller platen operated from said operating means to press the check strip against said type faces near the end of a key depression and while said check strip is tensioned across said type faces, and a check-strip feeding and issuing means gripping said check strip at the side of said type groups opposite said supply roll and operated by said operating means to issue the printed check during the return of said depressed keys to normal and while said check strip is slack.

14. In a key-operated check-printing and issuing cash register having depressible amount keys, means powered from said keys during depression thereof to return depressed keys to normal when released, and operating means actuated by said keys, a plurality of groups of type, a check-strip supply means at one side of said type groups, means operated by said operating means during a major portion of said key depression to act on said check strip between said supply means and the nearest of said type groups to tension said check strip across said type faces and pull a quantity of check strip from said supply means and to return said check-strip-engaging means to normal during return of said depressed keys to normal to create slack in said check strip, a roller platen, movable means rotatably supporting said roller platen, means to receive and store power gradually during a major portion of said key depression to move said supporting means to roll said platen on said check strip to press the latter against said type faces near the end of said key depression and while said check strip is tensioned across said type faces, and a check-strip feeding and issuing means gripping said check strip at the side of said type groups opposite said supply roll and operated by said operating means to issue the printed check during the return of said depressed keys to normal and while said check strip is slack.

15. In a key-operated cash register having depressible keys, a check printing and issuing mechanism comprising a plurality of groups of type, a roller platen having an axial bore therein, movable means rotatably supporting said roller platen, said supporting means including a shaft within said bore and of substantially less diameter than said bore except for a rib thereon substantially equal to said bore and substantially midway between the ends of said platen, and means actuated by power derived from said keys to move said supporting means to roll said platen on a check strip positioned across said type groups.

16. In a key-operated cash register having depressible amount keys, and type having their type faces substantially in a common surface, a roller platen having an axial bore therein, a shaft of substantially less diameter than said bore and within said bore, a circumferential rib on said shaft substantially midway between the ends of said roller platen, said rib being of a diameter greater than the diameter of said shaft and substantially equal to the diameter of said bore, movable means to support said shaft, and means operable by said keys to move said supporting means to move said shaft parallel to and roll said platen on said type faces.

17. The combination in a cash register of the type disclosed of a check-strip printing mechanism comprising a plurality of sets of type carriers arranged substantially in line, a check-strip supply means at one end of said line, a printing impression means, a check-strip moving means at the other end of said line, and a pair of side guides adjacent said moving means, said strip being otherwise substantially free of side guides between said supply means and said moving means, said moving means comprising a pair of cooperating rolls to pull said strip across the type carriers from said supply means, one of said rolls having substantially uniform pressure contact with said check strip, the area of such contact being limited transversely of the strip and disposed substantially symmetrically relative to the normal center line of the strip, whereby, when said check-strip moving means is operated, said strip may be easily pulled in a manner to maintain it in a straight line and substantially equally spaced between said side guides.

WALTER J. PASINSKI.